US010334401B2

(12) United States Patent
Marson

(10) Patent No.: US 10,334,401 B2
(45) Date of Patent: Jun. 25, 2019

(54) REAL TIME LOCATION SYSTEM

(71) Applicant: Weeguardians LLC, Hillsboro, OR (US)

(72) Inventor: Jonathan L. Marson, Hillsboro, OR (US)

(73) Assignee: Pigeon Networks, Co., Beaverton, OR (US)

( * ) Notice: Subject to any disclaimer, the term of this patent is extended or adjusted under 35 U.S.C. 154(b) by 0 days.

(21) Appl. No.: 15/853,641

(22) Filed: Dec. 22, 2017

(65) Prior Publication Data

US 2018/0184255 A1 Jun. 28, 2018

Related U.S. Application Data

(60) Provisional application No. 62/437,987, filed on Dec. 22, 2016.

(51) Int. Cl.
| | |
|---|---|
| H04W 4/90 | (2018.01) |
| H04W 4/029 | (2018.01) |
| H04W 4/02 | (2018.01) |
| G01S 19/42 | (2010.01) |
| G01S 5/14 | (2006.01) |
| H04W 12/06 | (2009.01) |
| G01S 5/00 | (2006.01) |
| H04W 4/80 | (2018.01) |

(Continued)

(52) U.S. Cl.
CPC ........... *H04W 4/029* (2018.02); *G01S 5/0027* (2013.01); *G01S 5/14* (2013.01); *G01S 19/42* (2013.01); *H04W 4/023* (2013.01); *H04W 12/06* (2013.01); *H04L 63/0414* (2013.01);

*H04L 63/08* (2013.01); *H04W 4/02* (2013.01); *H04W 4/80* (2018.02); *H04W 12/08* (2013.01)

(58) Field of Classification Search
CPC ...... H04W 4/90; H04W 4/029; G08B 17/318; G08B 21/0244; G08B 21/0277; G06K 17/00
USPC ..................... 340/426.19, 539.13; 455/456.1
See application file for complete search history.

(56) References Cited

U.S. PATENT DOCUMENTS

| 5,497,149 A * | 3/1996 | Fast ...................... B60R 25/102 340/426.19 |
| 6,618,005 B2 | 9/2003 | Hannah et al. |

(Continued)

*Primary Examiner* — William D Cumming
(74) *Attorney, Agent, or Firm* — Klarquist Sparkman, LLP

(57) ABSTRACT

A method includes receiving a beacon identifier and a location of a beacon associated with the beacon identifier from an individual location monitoring system operated by a first entity. The method further includes, with a data hosting system operated by a second entity, determining an identity of a monitored individual associated with the beacon identifier, associating the location of the beacon with the identity of the monitored individual, and receiving a request for the location of the monitored individual including authentication credentials. The method further includes, with the data hosting system, determining if the requesting individual is authorized to access data about the monitored individual and, if the requesting individual is authorized to access the data, providing the location of the monitored individual to the device, wherein the identity of the monitored individual is stored on the data hosting system and is inaccessible to the individual location monitoring system.

20 Claims, 19 Drawing Sheets

(51) Int. Cl.
    *H04W 12/08*      (2009.01)
    *H04L 29/06*      (2006.01)

(56)            References Cited

U.S. PATENT DOCUMENTS

| | | | |
|---|---|---|---|
| 7,365,645 B2* | 4/2008 | Heinze | G06K 17/00 |
| | | | 340/539.13 |
| 8,060,582 B2 | 11/2011 | Bliss et al. | |
| 8,077,030 B2 | 12/2011 | Kaminski et al. | |
| 8,232,876 B2 | 7/2012 | Derrick et al. | |
| 8,395,547 B2 | 3/2013 | Dhanani et al. | |
| 8,611,326 B2 | 12/2013 | Huang | |
| 8,836,580 B2 | 9/2014 | Mendelson | |
| 8,866,607 B2 | 10/2014 | Velusamy | |
| 9,113,300 B2 | 8/2015 | Marti et al. | |
| 9,232,357 B2 | 1/2016 | Buchheim et al. | |
| 9,699,612 B2 | 7/2017 | Evans et al. | |
| 9,826,356 B2* | 11/2017 | Mycek | H04B 17/318 |
| 2005/0212672 A1* | 9/2005 | Fry | G08B 21/0244 |
| | | | 340/539.13 |
| 2007/0028853 A1* | 2/2007 | Boyd | A01K 15/023 |
| | | | 119/721 |
| 2008/0139899 A1* | 6/2008 | Student | A61B 5/1112 |
| | | | 600/301 |
| 2008/0228039 A1* | 9/2008 | Huseth | G08B 21/0423 |
| | | | 600/300 |
| 2008/0316022 A1* | 12/2008 | Buck | G08B 21/02 |
| | | | 340/539.13 |
| 2017/0064667 A1* | 3/2017 | Mycek | H04B 17/318 |
| 2017/0171754 A1* | 6/2017 | South | H04W 4/90 |
| 2017/0316677 A1* | 11/2017 | Messier | G08B 21/0277 |
| 2018/0184255 A1* | 6/2018 | Marson | H04W 4/029 |

\* cited by examiner

FIG. 7

CHILD
DATA TABLE
700

| Child Identifier | Name | Age | Beacon identifier |
|---|---|---|---|
| 001 | Child 1 | 10 | Beacon001 |
| 002 | Child 2 | 8 | Beacon002 |
| 003 | Child 3 | 13 | |
| 004 | Child 4 | 6 | |

AUTHENTICATION
CREDENTIALS
DATA TABLE
800

| Authentication Credentials | Child Identifier |
|---|---|
| Token 01 | 001 |
| Token 02 | 001 |
| Token 03 | 002 |
| Token 03 | 003 |
| Token 03 | 004 |
| Token 04 | 005 |

FIG. 9

TRANSCEIVER NODE
DATA TABLE
900

| Transceiver identifier | location |
|---|---|
| Transceiver Node 01 | Location 1 |
| Transceiver Node 02 | Location 2 |
| Transceiver Node 03 | Location 3 |

FIG. 10

LOCATION DATA TABLE 1000

| Beacon1 | (41.336, 52.331) | 12:00:00 |
|---------|------------------|----------|
| Beacon2 | (31, -2, 5)      | 12:00:00 |
| Beacon1 | (3, 6, -3)       | 11:59:59 |
| Beacon2 | (14, 5, 52)      | 11:59:59 |
| Beacon1 | (3, -12, 7)      | 11:59:58 |
| Beacon2 | (6, 15, -23)     | 11:59:58 |

CAMERA LOCATION
DATA TABLE
1100

| Camera Identifier | Location | URL |
|---|---|---|
| Camera01 | Camera location 1 | URL1 |
| Camera02 | Camera locatoin 2 | URL2 |
| Camera03 | Camera locatoin 3 | URL3 |

MOBILE DEVICE
DATA TABLE
1200

| Security Token | Mobile Device Identifier |
|---|---|
| Token01 | Device001 |
| Token02 | Device002 |
| Token03 | Device003 |
| Token04 | Device004 |

REAL TIME LOCATION SYSTEM

CROSS REFERENCE TO RELATED APPLICATION

This application claims the benefit of U.S. Provisional Patent Application No. 62/437,987 filed on Dec. 22, 2016, which is incorporated herein by reference in its entirety.

FIELD

The present disclosure relates to real time location systems and methods.

BACKGROUND

Determining the physical location of objects and/or people can be valuable. Methods to locate objects and/or persons can involve the use of GPS, cellular networks, Bluetooth, RFID, WiFi, infra-red communication, electromagnetism and other technologies. However, many location methods are inconvenient to use and/or lack sufficient accuracy. As such, there exists a need for an improved real-time location system.

SUMMARY

Embodiments of a real time location system are disclosed herein. These embodiments can allow a parent or guardian to monitor the location of a child within a defined area.

In one representative embodiment, a method can comprise receiving a beacon identifier and a location of a beacon associated with the beacon identifier from an individual location monitoring system operated by a first entity. The method further comprises, with a data hosting system operated by a second entity, determining an identity of a monitored individual associated with the beacon identifier based at least in part on the beacon identifier, associating the location of the beacon with the identity of the monitored individual, and receiving a request from a device associated with a requesting individual for the location of the monitored individual. The request includes authentication credentials. The method further comprises, with the data hosting system, determining if the requesting individual is authorized to access data about the monitored individual based at least in part on the authentication credentials in the request, and if the requesting individual is authorized to access data about the monitored individual, providing the location of the monitored individual to the device associated with the requesting individual. The identity of the monitored individual can be stored on the data hosting system and can be inaccessible to the individual location monitoring system operated by the first entity.

In some embodiments, the device associated with the requesting individual can be a mobile device and the method can further comprise, with the data hosting system, determining a location of the mobile device, determining a first distance between the mobile device and the monitored individual, and sending a message to the mobile device if the first distance is greater than a predetermined threshold.

In some embodiments, the method can further comprise, with the data hosting system, determining a first distance between the monitored individual and a predetermined geographic area, and sending a signal to the mobile device if the first distance is less than a predetermined threshold.

In some embodiments, the signal sent to the mobile device can cause a message to appear on the mobile device.

In some embodiments, the device associated with the requesting device can be a mobile device and the method can further comprise, with the data hosting system, determining a location of the mobile device, determining a first distance between the monitored individual and a predetermined geographic area, determining a second distance between the mobile device and the monitored individual, and sending a message to the mobile device if the first distance is less than a first threshold and the second distance is greater than a second threshold.

In some embodiments, the method can further comprise, with the data hosting system, receiving a request from the device associated with the requesting individual to view video of the monitored individual, the request including the authentication credentials associated with the mobile device, determining if the individual associated with the authentication credentials is authorized to access data about the monitored individual, and determining which of one or more video cameras operated by the individual location monitoring system is closest to the monitored individual. The method further comprises authorizing the mobile device to view video from the determined video camera if the individual associated with the authentication credentials is authorized to access data about the monitored individual.

In some embodiments, the method can further comprise, with the data hosting system, receiving a request from the device associated with the requesting individual for authentication credentials, and assigning authentication credentials to the device.

In some embodiments, the method can further comprise, with the data hosting system, receiving data of the identity of the monitored individual to be associated with the requesting individual and with the authentication credentials, and associating the authentication credentials with the requesting individual and with the identity of the monitored individual.

In some embodiments, the method can further comprise, with the data hosting system, receiving a beacon identifier to be associated with the monitored individual, the beacon identifier being associated with a beacon to be worn by the monitored individual and configured to communicate with the individual location monitoring system, and associating the beacon identifier with the monitored individual.

In some embodiments, the method can further comprise providing the beacon identifier associated with the monitored individual to the individual location monitoring system.

In some embodiments, the method can further comprise encrypting the data of the identity of the monitored individual.

In some embodiments, the method can further comprise, with the data hosting system, receiving a request from the device associated with the requesting individual to authorize a second individual to access data about the monitored individual, the request including the authentication credential. The method further comprises determining if the requesting individual is authorized to access data about the monitored individual based at least in part on the authentication credentials, and if the requesting individual is authorized to access data about the monitored individual, authorizing the second individual to access data about the monitored individual.

In some embodiments, the monitored individual can be a child and the requesting individual can be the child's parent.

In another representative embodiment, a system can comprise one or more beacons located within a defined area, a plurality of transceiver nodes located within the defined area, a first computer system comprising one or more processors and memory coupled thereto and a second computer system comprising one or more processors and memory coupled thereto. The one or more beacons can be configured to transmit beacon data packets including a beacon identifier and data associated with a location of the beacon from which the beacon data packet is transmitted. The transceiver nodes can be configured, upon receipt of a beacon data packet, to transmit a transceiver node data packet including a transceiver node identifier, the beacon identifier of the beacon from which the beacon data packet was received, and the data associated with the location of the beacon from which the beacon data packet was received. The first computer system can implement an individual location monitoring system comprising a location determination tool and a first communication interface. The location determination tool can determine the location of the beacon based at least in part on the data associated with the location of the beacon. The first communication interface can transmit the determined location and the beacon identifier to a data hosting system. The second computer system can implement a data hosting system comprising an association tool, an authentication tool, and a second communication interface. The second communication interface can receive a request from a device associated with a requesting individual for the location of the monitored individual. The association tool can determine the identity of a monitored individual associated with the beacon identifier of the beacon from which the beacon data packet was received, and associate the location of the beacon with the identity of the monitored individual. The authentication tool can determine whether a device associated with a requesting individual is authorized to receive the location of the beacon and the identity of the monitored individual associated with the beacon. The second communication interface can transmit the location of the beacon to the device associated with the requesting individual if the requesting individual is authorized to receive the location.

In some embodiments, the transceiver nodes can be configured to measure metadata associated with the reception of the beacon data packets, and the transceiver node data packet can include the metadata.

In some embodiments, the metadata can comprise a power level, angle, or time associated with the reception of the beacon data packets.

In some embodiments, the location determination tool can be configured to determine a location of the device associated with the requesting individual. The data hosting system can further comprise a proximity tool to determine a distance between the device associated with the requesting individual and the monitored individual. The second communication interface can send a message to the device associated with the requesting individual if the distance is greater than a predetermined threshold.

In some embodiments, the data hosting system can further comprise a proximity tool to determine a distance between the monitored individual and a predetermined geographic area. The second communication interface can send a message to the device associated with the requesting individual if the distance is less than a predetermined threshold.

In some embodiments, the location determination tool can determine a location of the device associated with the requesting individual. The data hosting system can further comprise a proximity tool to determine a first distance between the monitored individual and a predetermined geographic area and to determine a second distance between the device and the monitored individual. The second communication interface can send a message to the device if the first distance is less than a first threshold and the second distance is greater than a second threshold.

In some embodiments, the data hosting system can further comprise a camera finder to determine which of one or more video cameras is closest to the location of the monitored individual. The second communication interface can receive a request from the device to view video of the monitored individual and send a signal to the device to allow the device to view video from the determined video camera.

BRIEF DESCRIPTION OF THE DRAWINGS

FIG. 7 is a diagram illustrating an example child data table.

FIG. 8 is a diagram illustrating an example authentication credentials data table.

FIG. 9 is a diagram illustrating an example transceiver node data table.

FIG. 10 is a diagram illustrating an example location data table.

FIG. 11 is a diagram illustrating an example camera location data table.

FIG. 12 is a diagram illustrating an example mobile device data table.

DETAILED DESCRIPTION

Many businesses and venues such as amusement parks, museums, zoos, shopping centers, and others often attract families with children. At such businesses, children may become separated from their parents and, depending on the size and layout of the business, it can be difficult for separated parents and children to find each other. This can cause distress in both parents and children and can lead to dangerous situations for the children. Existing methods of reuniting parents and children can be difficult and time-consuming. Furthermore, fear of becoming separated from their children can cause parents to avoid certain businesses. In order to address these problems, disclosed herein are exemplary embodiments of a real time location system that allows parents to locate their children using a smartphone or other electronic device. The disclosed real time location systems can be installed by a business and offered as a service to parents who bring children to the business.

Figure 1:
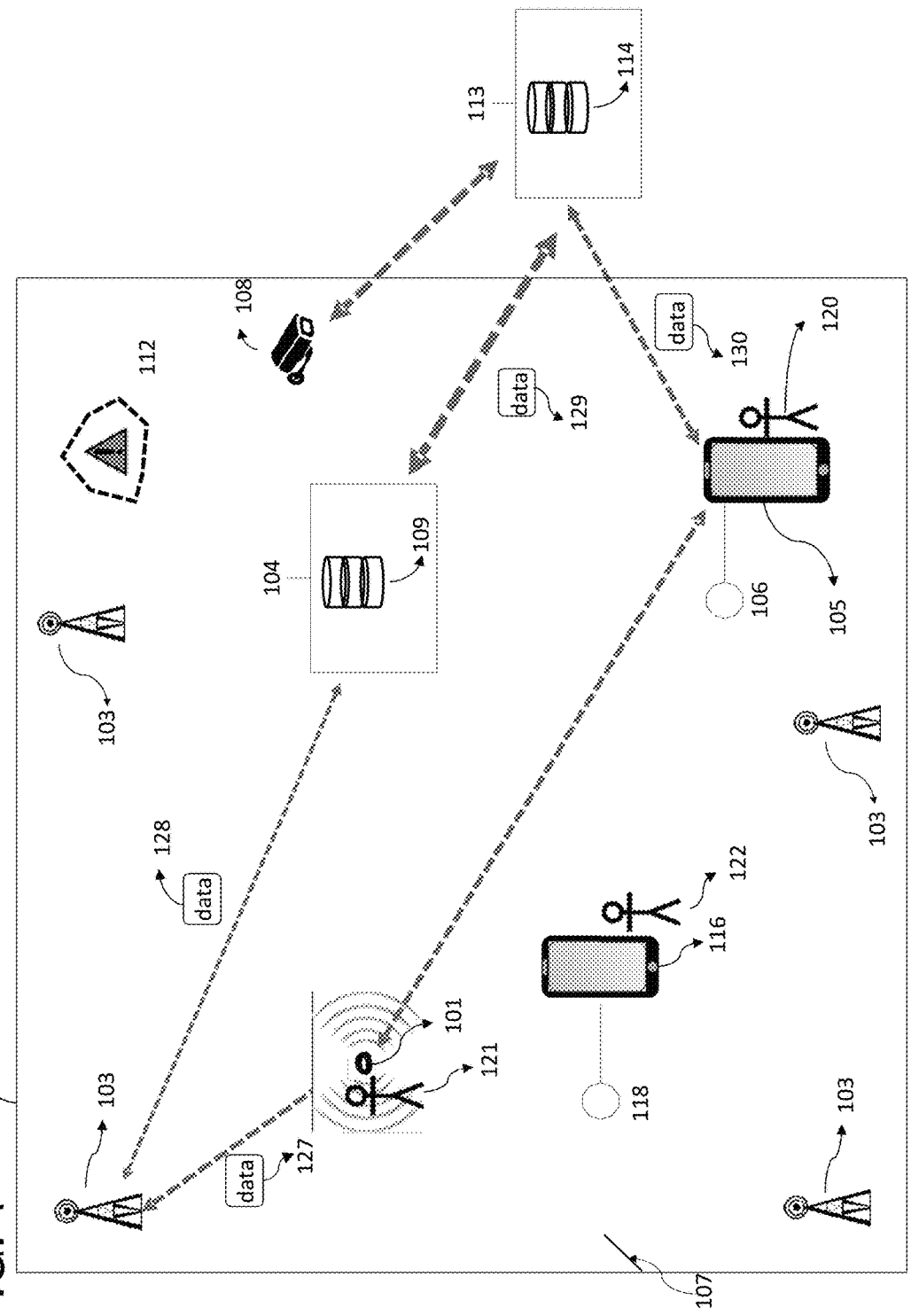
FIG. 1 is a schematic illustration of a real time location system, according to one embodiment of the disclosed technologies.

FIG. 1 shows a block diagram of a representative embodiment of a real time location system 100 according to one embodiment. The location system 100 can be installed in a defined area 102. The defined area 102 can comprise any indoor or outdoor space or combination thereof such as a museum, an amusement park, a concert venue, etc. In the illustrated example of FIG. 1, the defined area 102 is shown as single room for illustrative purposes. However, the defined area 102 may comprise multiple rooms, multiple floors, multiple buildings, one or more outdoor spaces of any shape and size, or any combination thereof.

Referring to FIG. 1, an individual whose location is to be monitored, such as a child 121, can be tracked or monitored within the defined area 102 by a monitoring individual such as a parent 120 or other individual having a guardian relationship to the child 121 through a device associated with the monitoring individual such as, for example, a mobile device 105. In the illustrated example, the mobile device 105 is a smartphone. In other examples, the mobile device 105 can be another electronic device, such as a dedicated hardware device specifically designed for the location system 100. The parent 120 can use the mobile device to monitor the location of the child 121 as disclosed herein.

Figure 2:
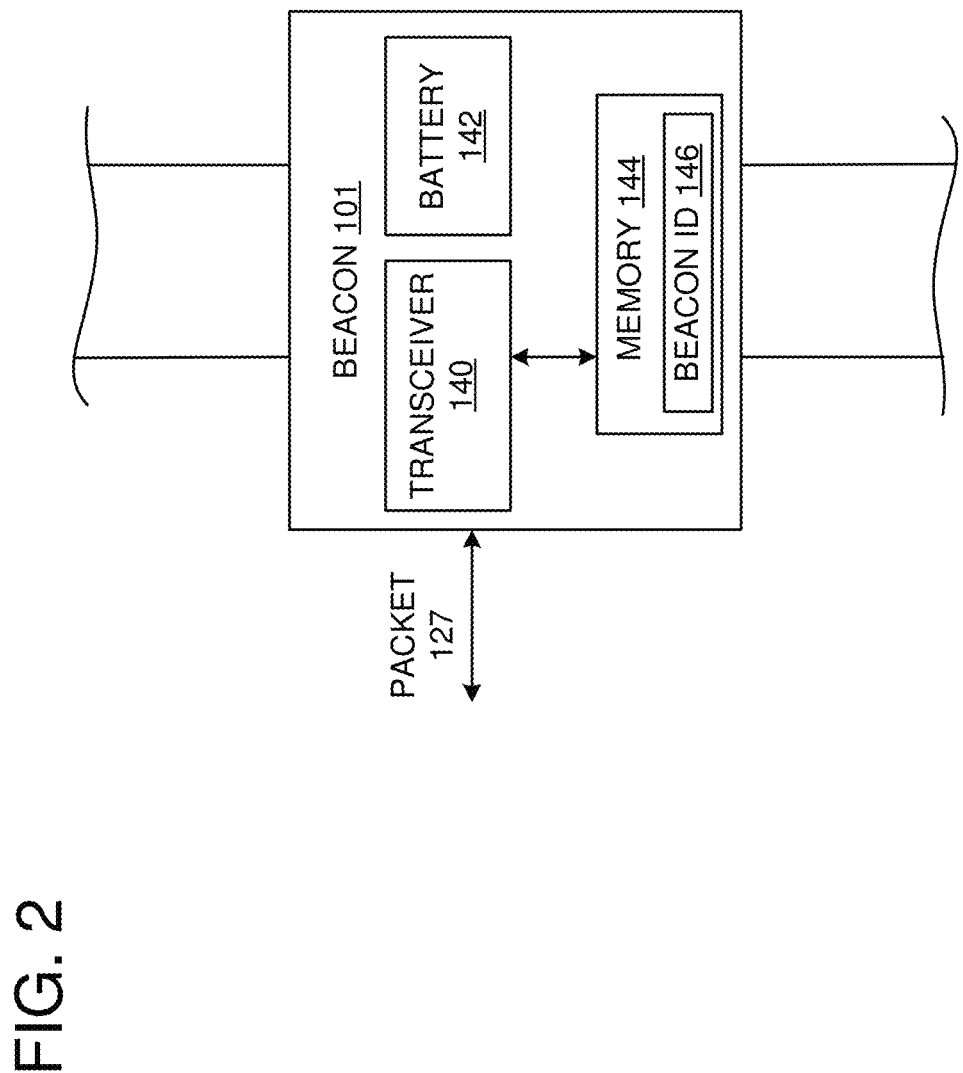
FIG. 2 is a block diagram of a representative embodiment of a beacon according to disclosed technologies.

Referring to FIG. 1, the location system 100 can comprise a beacon 101, a plurality of transceiver nodes 103, an individual location monitoring system (also referred to as a server) 104, and a data hosting system 113. A block diagram of a representative example of a beacon 101 is shown in FIG. 2. In the illustrated example of FIG. 2, the beacon is a bracelet that the child 121 can wear on their wrist. In other examples, the beacon 101 can be a smartphone or other device carried by the child, or a device attached to the child's shoe or other article of clothing. The beacon 101 can have a transceiver 140 that can emit or transmit data packets 127 (also referred to herein as beacon data packets) as described in further detail below. The beacon 101 can also contain a battery 142 to power the beacon, and a memory 144 such as volatile or non-volatile storage memory. In other examples, the beacon 101 can operate without a battery (e.g., powered inductively). In the illustrated example, the beacon 101 has a unique beacon identifier 146 that can be used to uniquely identify the beacon. The beacon identifier 146 can be stored in the memory 144. The beacon identifier may be, for example, a universally unique identifier (UUID). Alternatively, any other type of identifier can be used. Each beacon 101 that is part of the system 100 can have a different unique beacon identifier to distinguish it from other beacons in the area of interest 102. In certain configurations, the beacon 101 can also include a variety of other components such as processors, controllers, or other circuit components configured to perform the data transmission functionality of the beacon. Additionally, the memory 144 can also include software or firmware for performing the described functionality, in addition to the beacon identifier 146. In certain embodiments, the beacon 101 can measure data about an individual wearing the beacon such as heart rate, step count, oxygen level, etc. In some examples, this data can be stored in the memory 144.

Figure 3:
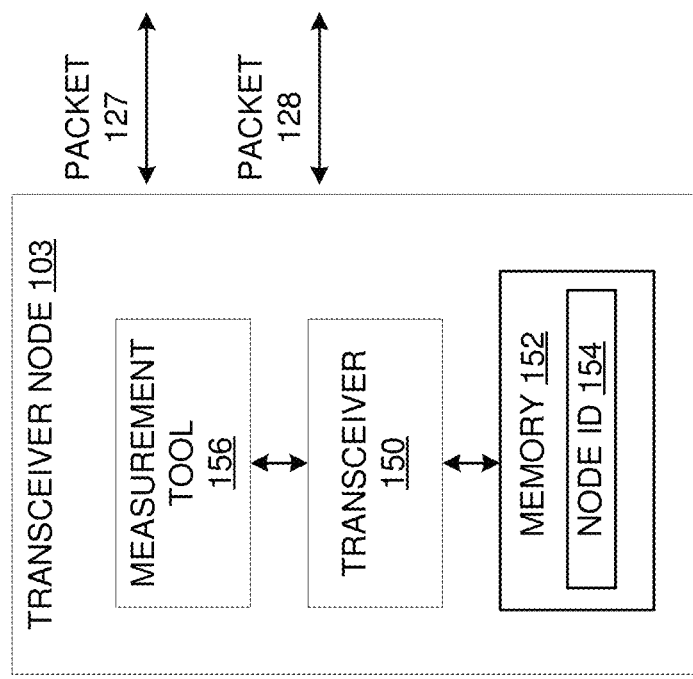
FIG. 3 is a block diagram of an example transceiver node according to the disclosed technologies.
Figure 4:
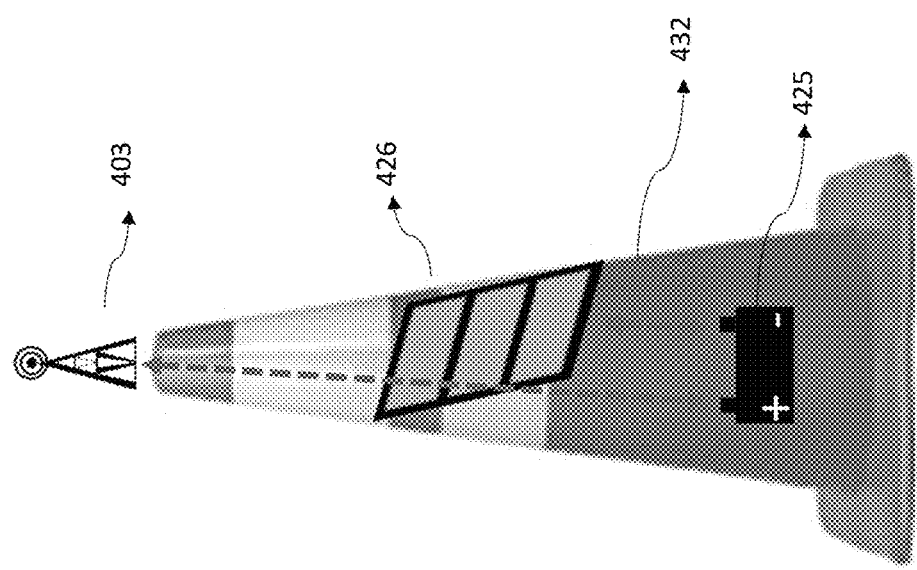
FIG. 4 is a block diagram of another example transceiver node according to the disclosed technologies.

A schematic block diagram of an example transceiver node 103 is shown in FIG. 3. The transceiver node 103 can have a transceiver 150 to receive data packets from the beacon 101, and to transmit data to the individual location monitoring system 104, as described in further detail below. The transceiver node 103 can also have a measurement tool 156 to measure certain data about data packets received from the beacon 101 (e.g., a power level of a received data packet). Each transceiver node 103 that is part of the system 100 can include a unique transceiver node identifier 154 to identify the particular transceiver node, which can be stored in a local memory 152. The transceiver node identifier 154 may be, for example, a UUID. The transceiver node 103 can be attached to or embedded in walls, floors, or ceilings, placed on the floor on in an outdoor space, put in closets or interior spaces, or located anywhere in the defined space 102. In some embodiments, the transceiver nodes 103 can be modular devices, and can be moveable to different locations around the defined area 102 depending upon the particular application. For example, FIG. 4 illustrates a transceiver node 103 configured as a cone 332. In the embodiment illustrated in FIG. 4, a transceiver 103 can be embedded in the cone 332 and the transceiver can be powered by an internal battery 425 and/or a solar panel 426, also located on or within the cone 332.

Referring back to FIG. 1, the transceiver nodes 103 can have any size or shape. The transceiver nodes 103 can be installed at various locations within the defined area 102. The number of transceiver nodes 103 and their locations can be chosen based on, for example, a portion or portions within the defined area 102 in which it is desired that the monitored individual 121 be locatable by the system 100. That is, there can be at least one transceiver node 103 within the broadcast range of a beacon 101 for particular regions within the defined area 102 where children are to be locatable by the system 100.

The individual location monitoring system 104 can monitor the locations of the beacon 101. In some embodiments, the individual location monitoring system 104 can be owned and/or operated by a first entity, such as the owner or operator of the defined area 102. For example, where the defined area is an attraction such as an amusement park or a museum, the first entity can be the owner or operator of the attraction, and can operate the individual location monitoring system 104 installed at the attraction. In some embodiments, the individual location monitoring system 104 monitors the beacons according to a beacon identifier associated with the beacon, and does not have information about the identity of the individual(s) using a particular beacon at the site. As such, the individual location monitoring system 104, and hence, the owner/operator of the defined area 102, may only access data regarding the location of a beacon 101 in the defined area 102, and not personal data about the identity of the individual wearing the beacon. In other words, the first entity has access to the location of beacons 101 present at the defined area 102 (e.g., via the beacon identifiers of those beacons), but not the identity of the monitored individual associated with the beacon. This can keep the identity of children on the premises anonymous, and protect the privacy of parents using the system 100 to monitor their children.

Figure 5:
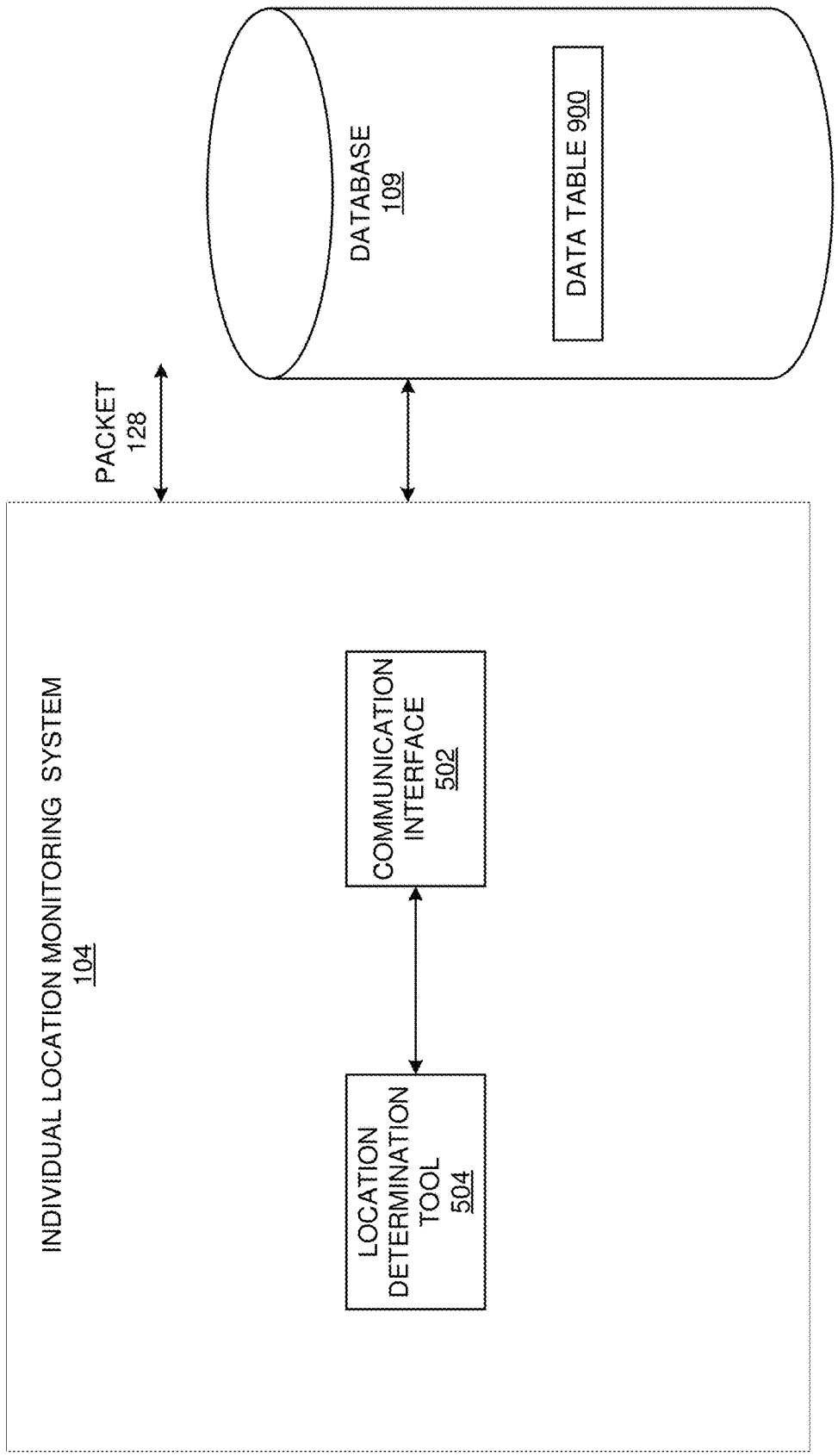
FIG. 5 is a block diagram of an example individual location monitoring system according to the disclosed technologies.

A block diagram of an example individual location monitoring system 104 is shown in FIG. 5. The system 104 can communicate with database 109. In some embodiments, the individual location monitoring system 104 and/or the database 109 can be located in or near the defined area 102. In other embodiments, the system 104 and/or the database 109 can be remote from the defined area 102, and can be a cloud based computing and/or database system. The individual location monitoring system 104 can monitor the location of an individual as disclosed herein.

Referring to FIG. 5, the individual location monitoring system 104 can comprise a communication interface 502 and a location determination tool 504. The communication interface 502 can be a transceiver or other interface that can transmit and receive data from transceiver nodes 103. The location determination tool 504 can determine the location of a child 121 and, in some examples, a parent 120 as disclosed in further detail below. The monitoring system 104 can also comprise a variety of other components such as processors, memory, etc., that implement the disclosed functionality.

Figure 6:
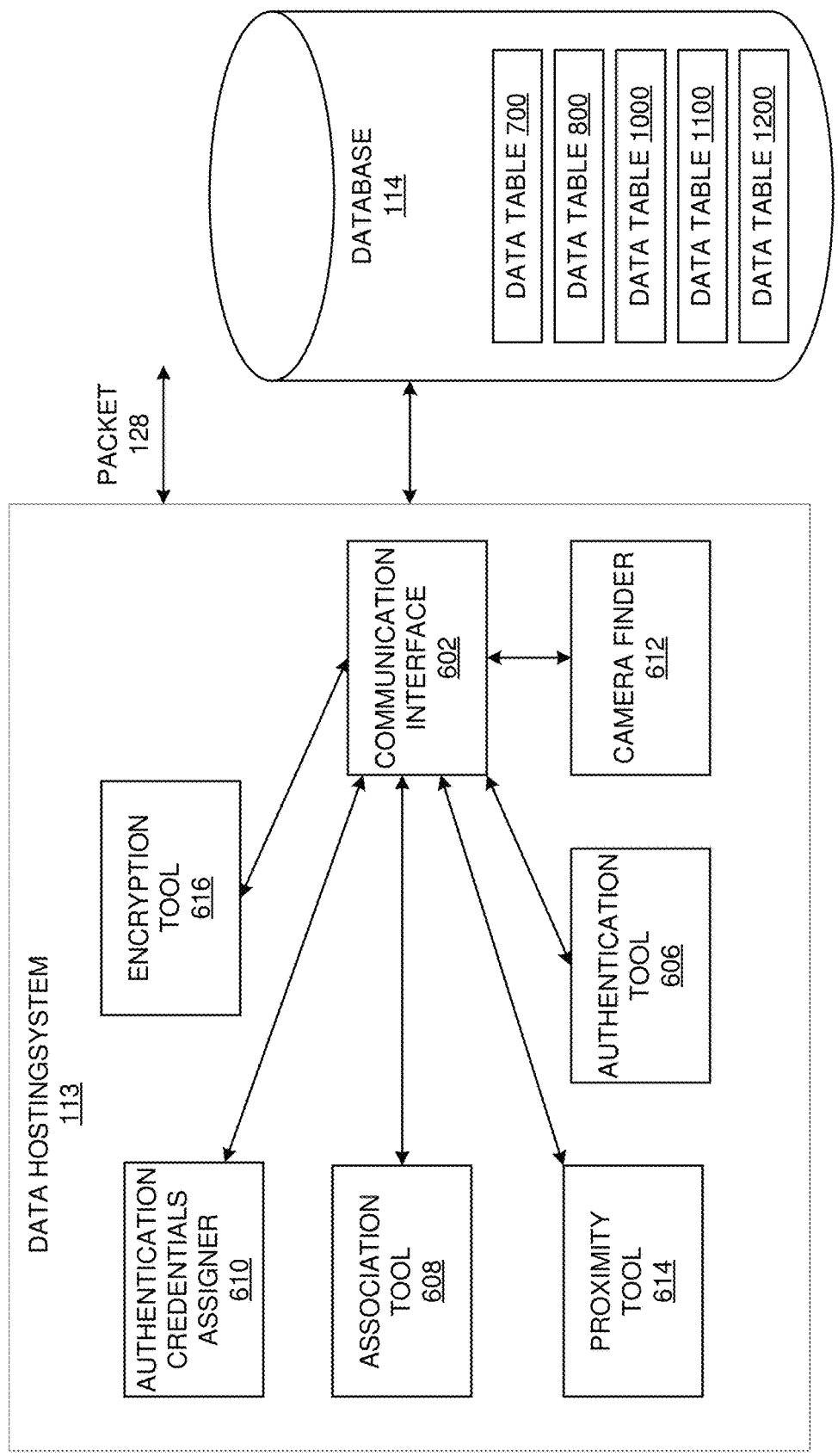
FIG. 6 is a block diagram of an example data hosting system according to the disclosed technologies.

Turning now to the data hosting system 113, the data hosting system 113 can store data associating the identity of specific individuals with location data about the beacon 101 associated with that individual, and can be in communication with the system 104 over, for example, the internet, or any other wired or wireless communication network. In some embodiments, the owner and/or operator of the data hosting system 113 may be a second entity that is different from the owner/operator of the defined area 102 and/or the owner/operator of the individual location monitoring system 104. For example, the second entity can be a service provider that offers the functionality of the system 113 to multiple different, distributed entities such as theme parks, museums, etc. These entities can operate their own individual location systems such as the system 104, which can be configured to interface with the system 113 operated by the second entity, but are not operated directly by the second entity. A block diagram of an example data hosting system 113 is shown in FIG. 6. The data hosting system 113 can communicate with a database 114. In some embodiments, the data hosting system 113 and/or the database 114 can be located in or near the defined area 102. In other embodiments, the data hosting system 113 and/or the database 114 can be remote from the defined area 102, and can be a cloud based computing and/or database system.

Referring to FIG. 6, the data hosting system 113 can comprise a communication interface 602, an authentication tool 606, an association tool 608, an authentication credentials assigner 610, a camera finder 612, a proximity tool 614, and an encryption tool 616. The communication interface 602 can be an optical or transceiver or other interface that can transmit and receive data from mobile devices such as mobile device 105 over, for example, a cellular network. The authentication tool 606 can determine whether monitoring individuals are authorized to access data about monitored individuals. The association tool 608 can associate monitored individuals with beacons and monitoring individuals with monitored individuals. The authentication credentials assigner 610 can assign authentication credentials to a monitoring individual (e.g., to an account associated with a monitoring individual such as a parent 120), and/or to a mobile device 105 associated with the monitoring individual. The camera finder 612 can locate video cameras that are near monitored individuals. The proximity tool 614 can monitor proximity between monitored individuals and monitoring individuals or between monitored individuals and dangerous or other specified areas. The encryption tool 616 can encrypt data stored in the database 114 using, for example, cryptographic hash functions. The data hosting system 113 can also comprise a variety of other components such as processors, memory, etc., which can implement the disclosed functionality. The specific operation of each of the components of the data hosting system 113 is described in further detail below.

In order for the parent 120 to monitor the child 121, the parent can download an application (referred to herein as a "location system application") onto their mobile device 105 (e.g., a smartphone). After installing and running the application, the mobile device 105 can communicate with the data hosting system 113. The parent can create an account with a username and password, or some other authentication tool(s). After creating an account, the account is assigned authentication credentials 106 by the authentication credentials assigner 610. The authentication credentials 106 can then be used by the data hosting system 113 to authenticate requests received (e.g., from the mobile device 105), and ensure that the data requested is only provided to mobile devices of account holders that are authorized to receive such data. As such, the combination of the location data of a child and the child's identity will only be accessible to an individual in possession of the authentication credentials 106. Stated differently, the location data of a child will be "owned" by the parent in the sense that only a parent, or other people authorized by the parent, will be able to track the location of the child in the defined area 102. In certain embodiments, the authentication credentials can comprise a security token, facial recognition, voice recognition, fingerprint recognition, username and password, phone number, pin number, etc. In some embodiments, the owner of the server 104 (e.g., a business using the location system 100) will have access to anonymous location data about children within the defined area 102, but will not be able to learn the specific identities of the children being tracked. This maintains the privacy of parents and children while a parent monitors their child's location. Additionally, in some embodiments, the data hosting system 113 may be usable with (e.g., in communication with) multiple different location monitoring systems such as the system 104, which may be owned and/or operated by different owners not associated with one another. In this manner, the parent may use the same account or authentication credentials with the data hosting system 113 for accessing data about their child when their child visits different locations operating location systems such as the system 104.

After being assigned authentication credentials, the parent 120 can use the location system application to upload information about one or more children that they would like to be able to track using the system 100. This can include the name of a child as well as other information about the child including, for example, age, height, weight, eye color, etc. In certain embodiments, the parent can also upload pictures of the one or more children. This information can be transmitted to the data hosting system 113 and stored in the database 114 in a data table, such as the child data table 700 of FIG. 7. In the illustrated example of FIG. 7, each child is assigned a child identifier 702 that can be used by the system 113 to identify specific children. The beacon identifier 146 is used during operation of the location system 100 as explained in further detail below.

In addition to storing the information about the children in child data table 700, the association tool 608 can associate each of the children in the child data table with one or more authentication credentials. The authentication credentials, in turn, can be associated with individuals that are authorized to access data about the child. The parent 120 or individual who set up the account will be authorized to access data about the children whose information they entered. Information of the authentication credentials 106 and the associated child identifiers 702 can be stored in an authentication credentials data table 800 illustrated in FIG. 8. The parent 120 can also authorize other individuals who have downloaded the location system application, such as friends or family members, to access data about their children. This can be done by sending a request to the system 113 including the authentication credentials assigned to the account, and providing information of the second individual to be given access privileges. Upon verification that the requesting individual is authorized to access data about a particular child, the system 113 can update the account to add an additional monitoring individual (e.g., another parent) with access privileges to the child's identity and location data. For example, whenever a new individual is given authorization to access data about a child, the association tool 608 updates the authentication credentials data table 800 to associate new individual with the identifier of the child. In some embodiments, the new monitoring individual may be given their own authentication credentials. In the illustrated example, any number of individuals can be associated with a child. In certain embodiments, a parent 120 can authorize an individual to access data about their child only for a limited time period. In certain embodiments, a parent 120 can authorize an individual to access only limited data about their child (e.g., the individual can be authorized to access the identity and location of the child, but not any other personal information).

In the illustrated example, when a parent 120 and a child 121 arrive at the defined area 102 utilizing the location system 100, the child is given a beacon 101 having a unique beacon identifier 146 associated with the beacon. In other examples, a parent 120 or child 121 may own a beacon 101 that can be used at a variety of businesses or venues utilizing the location system 100. Once a child 121 has a beacon, it can be paired with mobile device 105 by, for example, transmitting the beacon identifier 146 of the beacon 101 to the mobile device. In some embodiments, the beacon identifier 146 of the beacon 101 is transmitted to the mobile device 105 by holding the beacon and the mobile device near each other and transmitting the beacon identifier from the beacon to the mobile device using Bluetooth®, NFC, Wi-Fi, or any other suitable wireless or low power radio communication method. In other embodiments, the beacon identifier can be manually entered into the mobile device. In other embodiments, other methods can be used to associate a beacon identifier with a mobile device. If the parent 120 arrives with multiple children who are each given beacons 101, the beacon identifier 146 of each such beacon can be provided to the parent's mobile device. In examples where a parent 120 or a child 121 owns a beacon 101, the beacon 101 may be previously paired with mobile device 105 such that the beacon identifier of the beacon does not need to be transmitted to the mobile device upon arrival at the defined area 102.

After the beacon 101 is paired with the mobile device 105, the mobile device can transmit the beacon identifier 146 of the paired beacon 101 to the data hosting system 113. The communication interface 602 can receive this information and the association tool 608 can associate the beacon identifier 146 with the child 121 who is using that particular beacon. In certain embodiments, this can involve updating the child data table 700 to indicate that a child has a beacon with a particular beacon identifier. As such, the child data table 700 can include information about each child that has a particular beacon. When a child turns in a beacon and/or leaves the defined area, child data table 700 can be updated to reflect that that particular beacon is no longer with a particular child. In certain embodiments, the beacon identifier column can of child data table 700 can periodically be deleted, such as after a business closes for the day, to indicate that no more children are being tracked.

In the illustrated example, the beacon 101 periodically emits a low power radio signal, such as a Bluetooth® signal containing a data packet 127. In other examples, the beacon 101 can emit a signal via radio frequency identification (RFID) Wi-Fi, near-field communication (NFC), a cellular signal, a laser or other optical signal, or any other method. In the illustrated example, the beacon 101 emits a data packet 127 at periodic intervals (e.g., once every second). The data packet emitted by a beacon can contain the beacon identifier 146 associated with that particular beacon. In addition to a beacon identifier, the data packet 127 emitted by the beacon 101 can include other data such as a power level of the radio transmission by which the data packet was transmitted. This data can be used to determine the location of the beacon 101 within the defined area 102, as explained below.

In some embodiments, each transceiver node 103 within the broadcast range of a beacon 101 can receive a data packet 127 emitted by the beacon 101. When a transceiver node 103 receives a data packet, it receives the unique beacon identifier contained within that data packet and determines certain metadata that can later be used to determine the location of the beacon 101. In one embodiment, a received signal strength indication (RSSI) system can be used, and the metadata can comprise the power level of the signal received from the beacon 101. In certain configurations, each beacon can transmit a data packet at a known, predetermined power level. In other embodiments, the data packet 127 can include data of the power level of the transmission, as described above. As a data packet travels from a beacon 101 to a transceiver node 103, the power level falls off at a known, predictable rate based on the distance travelled by the data packet. Thus, when a transceiver node receives a signal from a beacon, the measurement tool 156 of the transceiver node can measure the power level of the signal, which can correspond to the distance the signal has travelled. If multiple transceiver nodes at different known locations each receive the same signal from a beacon at specific power levels, the precise location of the beacon that sent the signal can be determined.

In another embodiment, an ultra-wide band (UWB) system can be used, and the metadata recorded by the transceiver node 103 can be the precise time that a signal was received by the transceiver node. If multiple transceiver nodes at different known locations each receive the same signal from a beacon 101 at different times (typically within nanoseconds of each other), the precise location of the beacon can be determined. In other embodiments, the metadata recorded by the transceiver node 103 when receiving a signal from a beacon 101 can be an angle of arrival of the signal or any other information about the signal that can be used to determine the location of the beacon from which the signal was emitted.

In the illustrated example of FIG. 1, after receiving one or more data packets from one or more beacons, a transceiver node 103 can transmit a signal containing a transceiver node data packet 128 to the individual location monitoring system 104. In some embodiments, the transceiver nodes 103 can transmit a transceiver node data packet 128 shortly after receiving a data packet 127 from a beacon 101. In other embodiments, the transceiver nodes 103 can store data and transmit a signal to the monitoring system 104 at predetermined time intervals (e.g., once every second). In these embodiments, the signal transmitted by a transceiver node 103 can comprise multiple transceiver node data packets 128 if multiple data packets 127 have been received from one or more beacons 101 during the applicable time interval. That is, for each data packet 127 received from a beacon 101, the transceiver node 103 can send out a corresponding transceiver node data packet 128.

In the illustrated example, each transceiver node data packet 128 emitted by a transceiver node 103 contains the beacon identifier 146 associated with the beacon 101 that sent a corresponding data packet 127, metadata associated with the data packet 127, and a transceiver node identifier 154 associated with the particular transceiver node 103 sending the transceiver node data packet. The device identifier contained in transceiver node data packet 128 allows the data hosting system 113 to identify the particular beacon 101 to be located. The transceiver node identifier 154 contained in data packet 128 allows the monitoring system 104 to identify the particular transceiver node 103 sending transceiver node data packet 128. And the metadata contained in the transceiver node data packet 128 can be used by the monitoring system 104 along with the transceiver node identifier to determine a location of the beacon 101 that sent the corresponding data packet 127.

The communication interface 502 of the monitoring system 104 can receive data packets 128 from each of the transceiver nodes 103 that are part of the system 100 and the location determination tool 504 can determine a location of a beacon as described herein. The database 109 can maintain a list of the locations of each transceiver node 103 that is part of the system 100 and a corresponding transceiver node identifier for each such transceiver node. In certain embodiments, this information is stored in a data table such as transceiver node data table 900 of FIG. 9. As the data hosting system 113 receives data packets 128 from various transceiver nodes 103, the location determination tool 504 can aggregate these data packets and determine a location or locations of one or more beacons 101 based on the information contained in the received data packets (e.g., using RSSI or another system as described above).

For example, in embodiments that use RSSI, each received data packet 128 includes a beacon identifier 146, a transceiver node identifier 154, and a power level corresponding to a data packet 127 sent from a beacon 101 having that particular beacon identifier to a transceiver node with that particular transceiver node identifier. If another transceiver node 103 also received that same data packet from the same beacon, that transceiver node would transmit a data packet 128 to the individual location monitoring system 104 containing the same beacon identifier but a different transceiver node identifier and a different power level. By aggregating all such data packets 128 relating to the same beacon identifier, the location determination tool 504 can convert the power level measured by each transceiver node to a distance between the transceiver node and the beacon. The location determination tool 504 can then query the database 109 to look up the known location of each transceiver node 103 that sent a corresponding data packet, and then use this location information along with the computed distances between each transceiver node and the beacon 101 to triangulate or otherwise calculate the precise physical location of the beacon 101.

Referring back to the example of FIG. 1, after the location determination tool 504 determines the location of a beacon 101, the communication interface can transmit a data packet 129 to the data hosting system 113 containing this location and the beacon identifier of the beacon. The communication interface 602 of the data hosting system 113 can receive data packet 129 containing the location and the beacon identifier and can store the location information in the database 114 along with a timestamp of the current time. In certain embodiments, other data associated with the determined location can be included in data packet 129 stored in the database 114 such as power level data used by the RSSI system. In certain embodiments, the location data can also be stored in database 109. In the illustrated example, location data can be stored in database 114 in a data table such as location data table 1000 of FIG. 10. In the example of FIG. 10, location data table 1000 includes the beacon identifier of a beacon, the determined location of the beacon, and a timestamp of the current time. As more data packets 129 are received by the data hosting system 113, the data hosting system can continue to add more data to location data table 1000 to create a time log of the location of beacons throughout the day that can be later analyzed as described further below. This also allows a parent 120 to access the location of their child at any particular time that their child had beacon 101.

In certain embodiments, the location data is recorded as a latitude and longitude measurement, or as Cartesian coordinates on a map of the defined area 102. In some embodiments, the location recorded is a position relative to a particular location or landmark within the defined area 102. In some embodiments, the location data can be relative to a particular floor of a building and/or a door or other entrance to the premises. In other embodiments, any other method of recording a physical location can be used. In certain embodiments, before recording the location data in the database, the association tool 608 can query the child data table 700 to determine the identity of the child that has the beacon whose location has been determined and then the child identifier or name of the child can be recorded in location table 1000 rather than the beacon identifier associated with the child.

As the data hosting system 113 updates the database 114 with the location of children with beacons 101 within the defined area 102, parents can track the location of their children with a mobile device as described herein. As described above, the data hosting system 113 will create a log of the child's location over time in the database 114. In order for a parent 120 to access the location of child 121, the parent's mobile device 105 sends a request for location data of the child comprising data packet 130 to the data hosting system 113 using the location system application. Data packet 130 can comprise the authentication credentials 106 associated with their account and/or mobile device, and may include the identity of the child whose location is desired, depending upon the particular implementation. In some examples, the identity of the child in data packet 130 can comprise the child identifier of the child. In other examples, the identity of the child in data packet 130 can comprise the name or other identifying information of the child. Alternatively, data packet 130 can comprise the authentication credentials and the beacon identifier of the beacon that the child 121 is using. In the illustrated embodiment, this operation and all other operations of mobile device 105 described herein can be controlled through the location system application with a graphical user interface (GUI) or other interface (e.g., voice command activated) that allows the parent to easily use the location system 100 without having the knowledge of the specific operation of the location system as described herein.

After the data packet 130 is sent from mobile device 105 to the data hosting system 113, the communication interface 602 can receive the data packet. After receiving data packet 130, the authentication tool 606 can authenticate the authentication credentials 106 and determine whether the mobile device 105 associated with the authentication credentials 106 is authorized to access location data about the child 121. In the illustrated example, the authentication tool authenticates the authentication credentials by querying the authentication credentials data table 800 of the database 114. After authenticating the authentication credentials 106, the data hosting system 113 queries the location data table 1000 to determine the most recent location of child 121. This location data can then be transmitted by the communication interface 602 to the mobile device 105. The application on the mobile device can then display this location (e.g., superimposed on a map of the defined area 102) on a display of the mobile device.

In some examples, the mobile device 105 can request the location of a child at a particular time. When such a request is made, the data packet 130 sent from the mobile device 105 to the data hosting system 113 can contain a time. When the data hosting system 113 receives this data packet, after authenticating the requesting mobile device or account, it looks up the child's location at the specified time in the location data table 1000. In other examples, a mobile device 105 can request the location of a child over a particular time period that will be specified in data packet 130. In these examples, the data hosting system 113 can look up the location of a child over that time range in location data table 1000 and return this location data.

In another embodiment, there can be one or more video cameras, such as video camera 108 of FIG. 1, in the defined area 102 whose video feeds can be remotely accessed and a parent can request to view the live video feed for the video camera closest to their child in order to see their child in real time. In this embodiment, the database 114 has a data table comprising locations of video cameras within the defined area 102, such as camera location table 1100 as shown in FIG. 11. To request a live video feed of child 121, mobile device 105 sends a request to the data hosting system 113 comprising authentication credentials 106 and the identity of a child or a beacon identifier. After the communication interface 602 receives the request, the authentication tool 606 authenticates the authentication credentials and the location determination tool 604 determines the most recent location of the child as described above. The camera finder 612 can then determine the location of the closest video camera to the child's location by querying camera location table 1100 and comparing each location listed therein to determine which camera is closest to the determined location of the child. After determining which camera is closest to the child included in the request from mobile device 105, the communication interface 602 can send a signal to the mobile device allowing live video from this camera to play on the mobile device. In some examples, the camera location data table 1100 can store URLs to access video feeds of the cameras and the signal sent by the communication interface can be a web link to a URL that the user of the mobile device can click on to view the video feed. In other examples, the signal sent by the database can cause the video feed to automatically play in the location system application or another application on the mobile device. In some embodiments, the camera finder 612 can be part of the individual location monitoring system 104, the camera location table 1100 can be stored in the database 109 and the request to view video footage of a child can be sent to and processed by the individual location monitoring system 104 using the steps described above.

In another embodiment, a parent 120 can authorize other individuals, such as person 122 of FIG. 1 who has a mobile device 116, to access their child's location or data. Person 122 could be a friend or family member or someone that the parent 120 meets within the defined area 102. In order to authorize another person 122 to view their child's location data, the person 122 can first download the location system application on their mobile device 116 and set up an account, which will result in new authentication credentials 118 to be issued for the new account. Parent 120 can then use the location system application on their mobile device 105 to add a new authorized user by entering the phone number, account number, or other identifying information of person 122 and/or mobile device 116. The mobile device 105 can then send a request to the data hosting system 113 to authorize person 122 to view data about their child. This request can contain authentication credentials 106 associated with the parent 120 and the identifying information of person 122. After the communication interface 602 receives this request, the authentication tool 606 can authenticate the authentication credentials 106 and then the association tool 608 can associate authentication credentials 118 with the child by, for example, updating authentication credentials data table 800. In some examples, the parent 120 can authorize person 122 to view only a limited amount of data about their child or to access data about their child only for a limited time.

In another embodiment, parents can get information about the people their children spent time with while using the location system 100. For example, children might become friends with other children that they might otherwise not be able to contact again. Or a parent may want to know that their child was followed by a bully or other undesirable individual. In this embodiment, a parent 120 can use the location system application on their mobile device 105 to request a list of other children that their child was in proximity to within the defined area 102 for a significant period of time. This request can be sent from the parent's mobile device to the data hosting system 113 and can be received by communication interface 602. After the communication interface 602 receives this request, the data hosting system 113 can query location data table 1000 of the database 114 for a time series location data of this parent's child and then determine if the location of any other children was nearby that child (i.e., within a threshold distance) for a significant period of time (i.e., above a threshold time period).

In some examples, the communication interface 602 can then send the name or other information about these children back to the mobile device 105. In other examples, the data hosting system 113 does not send the name of these children back to the parent 120, but instead creates an icon or other option on the location system application on the parent's mobile device 105 that allows the parent 120 to send a message to the parent or parents of these other children indicating that they would like to contact them. This maintains the privacy of these other children and their parents while still allowing the parents of both children to contact each other should they so desire so that they can make future plans to get together outside of the defined area 102.

In another embodiment, the defined area 102 can contain one or more designated areas. In some examples, these designated areas can be areas within the defined area 102 that are determined to be dangerous or areas that children should stay away from, such as restricted exit 107 or hazardous area 112. In other examples, a defined area within the defined area 102 can be a special area that offers prizes or that are otherwise desirable locations for children to be. In this embodiment, as the location data is recorded in location data table 1100, the proximity tool 514 can determine if a child's location is too close to one of these defined areas (e.g., less than a threshold distance away from the area). If this happens, the association tool 608 can determine one or more mobile devices associated with the child whose location is too close to the defined area and the communication interface 602 can send an appropriate message to these mobile devices indicating where the child is and that they are close to a particular defined area. In some examples, the communication interface 602 can also send a message to a staff member associated with the defined area 102. In some examples, the designated area can be part of a game or contest and if a child enters the designated area, a message awarding a prize can be sent to the mobile device associated with the child. In some examples, the designated area can contain an image or projection such as a digital coin superimposed on the ground. In these examples, entering the designated area (i.e., stepping on the digital coin) can cause a prize to be awarded. In certain embodiments, one or more of these steps may be performed by the system 104 and/or by the system 113.

In another embodiment, the location system 100 can also monitor the location of parents, such as parent 120, using the parent's mobile device 105. In some examples, this can be accomplished using the GPS location tool on the mobile device 105. In these examples, the mobile device periodically (e.g., once per second) sends its GPS determined location to either the data hosting system 113 or the individual location monitoring system 104 (which can forward this location to the data hosting system 113 in some examples). In other examples, the location of mobile device 105 is determined in the same manner that the location of beacon 101 is determined. In these examples, the mobile device 105 can periodically send out a data packet similar to data packet 127 via Bluetooth® or another method of data transmission. The data packet emitted by mobile device 105 can include a mobile device identifier associated with mobile device 105. In some examples, the data packet emitted by the mobile device 105 can also include other data, such as the power level of the emitted data packet. The transceiver nodes 103 can receive the data packets emitted by mobile device 105 and transmit a new data packet to the individual location monitoring system 104. This new data packet can be similar to data packets 128 emitted in response to the reception of data packet 127 from beacon 101 and can include the mobile device identifier of the mobile device 105, a transceiver node identifier associated with the particular transceiver node emitting the data packet, and other data associated with the reception of the data packet from the mobile device 105 (e.g., the power level of the received signal). The communication interface 502 can receive these data packets from each of the various transceiver nodes 103 in the defined area 102 and the location determination tool 504 can determine a location of the mobile device in a similar manner as is used to determine the location of beacon 101 (e.g., using RSSI). The communication interface 502 can then send this location data along with identifying information about the mobile device 15 to the data hosting system 113. The database 114 can contain a data table associating mobile device 105 with a particular mobile device identifier, such as mobile device data table 1200 of FIG. 12. In the example of FIG. 12, mobile device data table 1200 associates a mobile device identifier with particular authentication credentials. In certain embodiments, a mobile device identifier can be assigned to a mobile device when an account is created on the location system application. Alternatively, a mobile device identifier can be assigned when a particular mobile device is associated with an account. In certain embodiments, as location data of a mobile device 105 is determined, this location data can be stored in the database 114 (e.g., in a data table similar to child data table 500). In some embodiments, the location data of a mobile device can be stored in database 109.

In certain embodiments where location data of a parent's mobile device is tracked by the location system 100, the proximity tool 614 can determine a distance between a parent 120 and the child 121 associated with that parent (or that parent's mobile device 105) and can send an alert to the mobile device 105 if the child gets too far from the parent (e.g., the distance between the child and the parent is above a threshold distance). In some examples, the parent 120 can use the location system application to set this threshold distance.

In certain embodiments, the proximity tool 614 can determine the distance between a child 121 and a dangerous area such as exit 107 or hazard 112 and the distance between a child 121 and a parent 120. In these embodiments, the communication interface 602 can send an alert to a parent 120 if the child is close to a dangerous area (e.g., within a certain threshold distance) and the parent is not close to the child 121 (e.g., further away than a threshold distance). In some examples, the parent 120 can use the location system application to set these thresholds. In these embodiments, the parent is not alerted that their child is near a dangerous area when the parent is also near the dangerous area as the parent can presumably see their child and monitor them around the dangerous area. In some examples, when the proximity tool 614 determines that the child 121 is close to a dangerous area and the parent 120 is not near the child, the communication interface 602 sends an alert to a staff member. In some examples, the location system 100 can monitor the location of staff members and send an alert to the nearest staff member.

In certain embodiments where the location system monitors a parent's location within the defined area, the location system application can be used by a parent 120 to order goods and services to be delivered their location (e.g., food or beverage). In these embodiments, the location system application can present a menu or other ordering option on the parent's mobile device 105. In some examples, the mobile device 105 can request a list of goods or services that can be ordered. In some examples, an order for goods and services can be made through the application, wherein the mobile device 105 transmits the order to the data hosting system 113. The communication interface 602 can receive this order and an appropriate staff member can be notified of the order and the parent's location so that the staff member can prepare the order and the ordered can be delivered to the parent's location by a staff member or autonomous device such as a drone. In some examples, the parent can pay for the goods or services ordered through the application on their mobile device. In some examples, an order for good or services can be sent by the mobile device 105 to the individual location monitoring system 104 rather than the data hosting system 113.

In certain embodiments, the data hosting system 113 can monitor a child's location for abnormal activity, for example if a child stays in one location for a long period of time without moving. This may indicate that the child is injured or in need of assistance and the communication interface 602 can send an alert to the child's parent and/or a staff member indicating the child's location and the abnormal activity detected.

In certain embodiments, the location system application can be used by a parent to request that a staff member check on their child when the parent is too far away but they are concerned that their child needs help or assistance in some way. In these embodiments, the location system application can have an icon or other method of contacting a staff member near their child's location by phone, text, or any other method of communication.

In certain embodiments, the data hosting system 113 can analyze a child's location log during the day and determine what locations in the defined area 102 the child spent significant time at or near. This information can be requested by or reported to the child's parent to give the parent information about the type of activities their child is interested in (e.g., their child may have a significant amount of time near a particular museum exhibit).

In certain embodiments, a business or venue using location system 100 can access anonymous location data stored in the database 114. That is, an owner of defined area 102 can access location data associated with particular wireless device identifiers, but will not be able to associate this location data with the identity of any particular individual. However, the business or venue can still use this data to perform data analytics to determine, for example, which parts of the defined area 102 are receiving more or less traffic, where congestion occurs in the defined area, and other information that can be obtained from anonymous location data.

Figure 13:
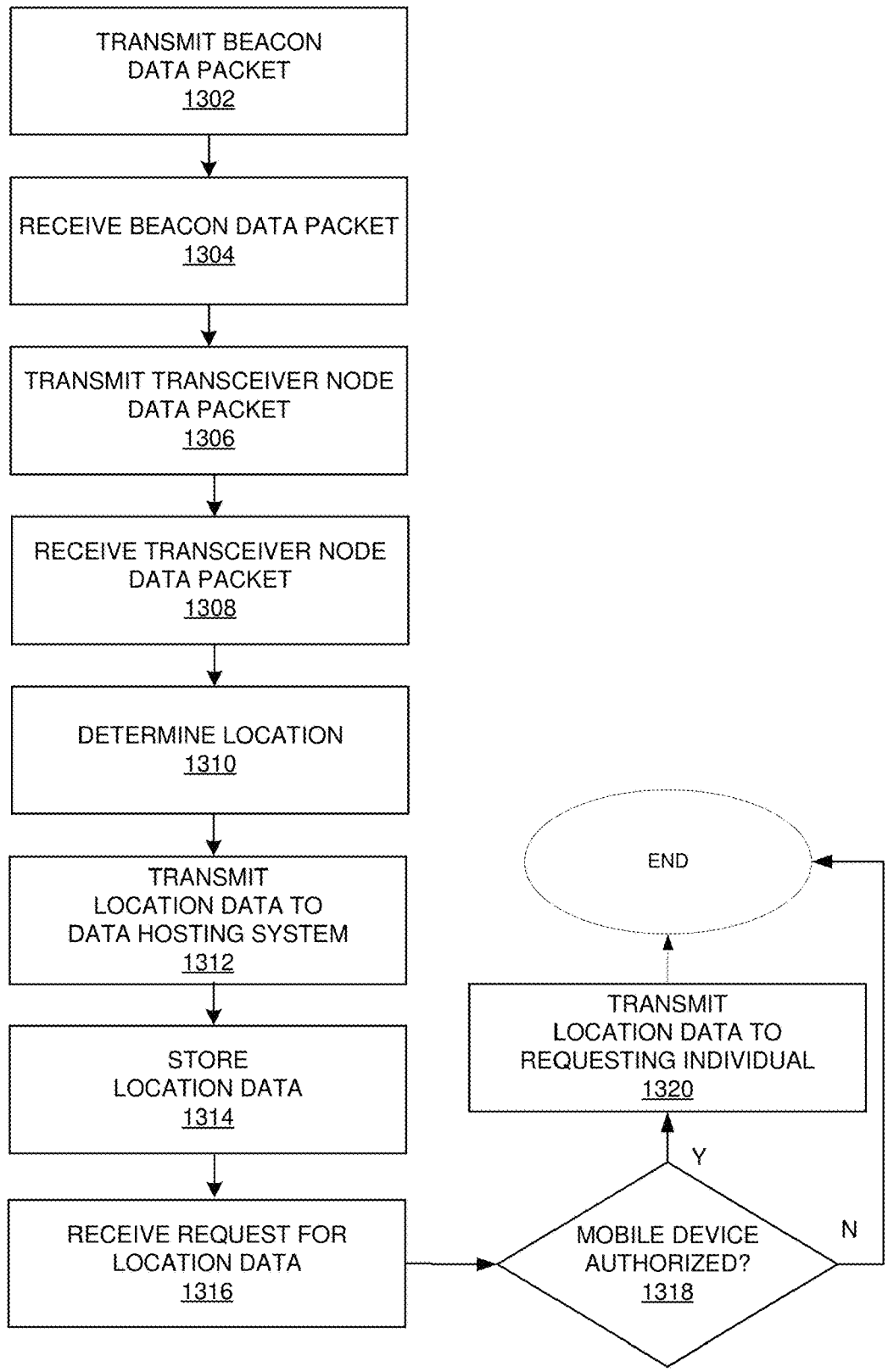
FIG. 13 is a flowchart depicting an example method according to disclosed technologies.

FIG. 13 is a flowchart 1300 depicting an example method for a monitoring individual to track the location of a monitored individual according to disclosed technologies. The example of FIG. 13 begins at process block 1302 when the beacon 101 associated with the monitored individual 121 transmits a beacon data packet 127 containing a beacon identifier 146 and certain other data. At process block 1304, the transceiver node 103 receives the beacon data packet 127.

At process block 1306, the transceiver node 103 transmits a transceiver node data packet 128 to the data hosting system 113. Transceiver node data packet 128 can contain the beacon identifier 146 and any other data included in beacon data packet 127 as well as any metadata measured by the transceiver node 103 about the transmission of beacon data packet 127. At process block 1308, the communication interface 502 receives one or more transceiver node data packets 128. At process block 1310, after receiving the one or more transceiver node data packets, the location determination tool 504 determines a location of the beacon 101 associated with the monitored individual. At process block 1312, the communications interface 502 transmits the determined location and the associated beacon identifier to the data hosting system 113. At process block 1314, the data hosting system 113 associates the beacon identifier and the location data with the identity of the monitored individual associated with the beacon identifier, and stores the received location data in the database 114.

At process block 1314, the communication interface 602 receives a request for location data from mobile device 105. At process block 1314, after receiving the request for location data, the authentication tool 606 determines if the mobile device 105 is authorized to view location data about the monitored individual. If the authentication tool determines that the mobile device is authorized to view location data about the monitored individual, then the communication interface 602 transmits the location of the monitored individual to the mobile device at process block 1316. If the authentication tool determines that the mobile device is not authorized to view location data about the monitored individual, then the location data is not transmitted and the example of FIG. 13 ends.

Figure 14:
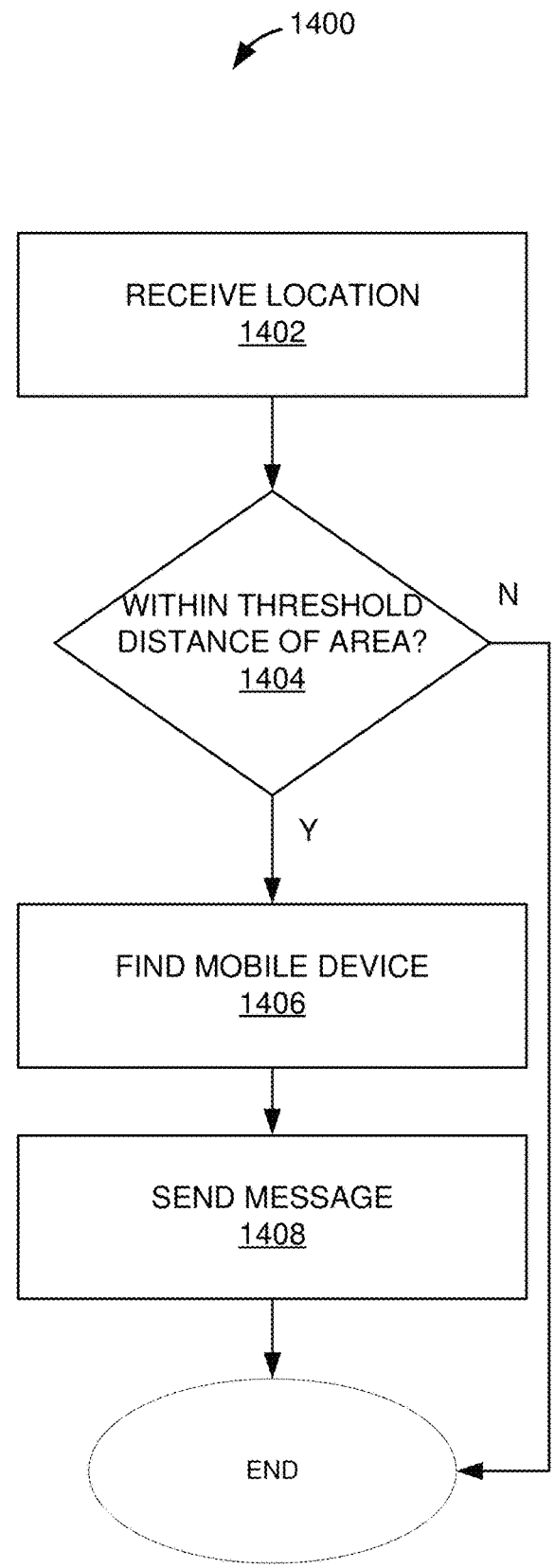
FIG. 14 is a flowchart depicting a second example method according to disclosed technologies.

FIG. 14 is a flowchart 1400 depicting an example method for determining if a monitored individual is in close proximity to a designated area, such as a predetermined dangerous area or a special area that can award prizes. The example of FIG. 14 begins at process block 1402 when the communication device 602 receives a location of the monitored individual. At process block 1404, the proximity tool 614 determines if the location of the monitored individual is within a threshold distance of a designated area. In some embodiments, this step may be performed by the system 104 and the result transmitted to the system 113. If the proximity tool determines that the monitored individual is within a threshold distance of the designated area, then the association tool determines a mobile device that is associated with the monitored individual in process block 1406 and the communication interface 602 sends an appropriate message to that mobile device in process block 1408. If the proximity tool determines that the monitored individual is not within a threshold distance of the designated area, then a message is not sent and the example of FIG. 14 ends. In some examples, process block 1408 can comprise sending a signal to the associated mobile device without the user of the mobile device seeing a message (e.g., an indication that can be viewed in another part of the location system application that a prize has been awarded).

Figure 15:
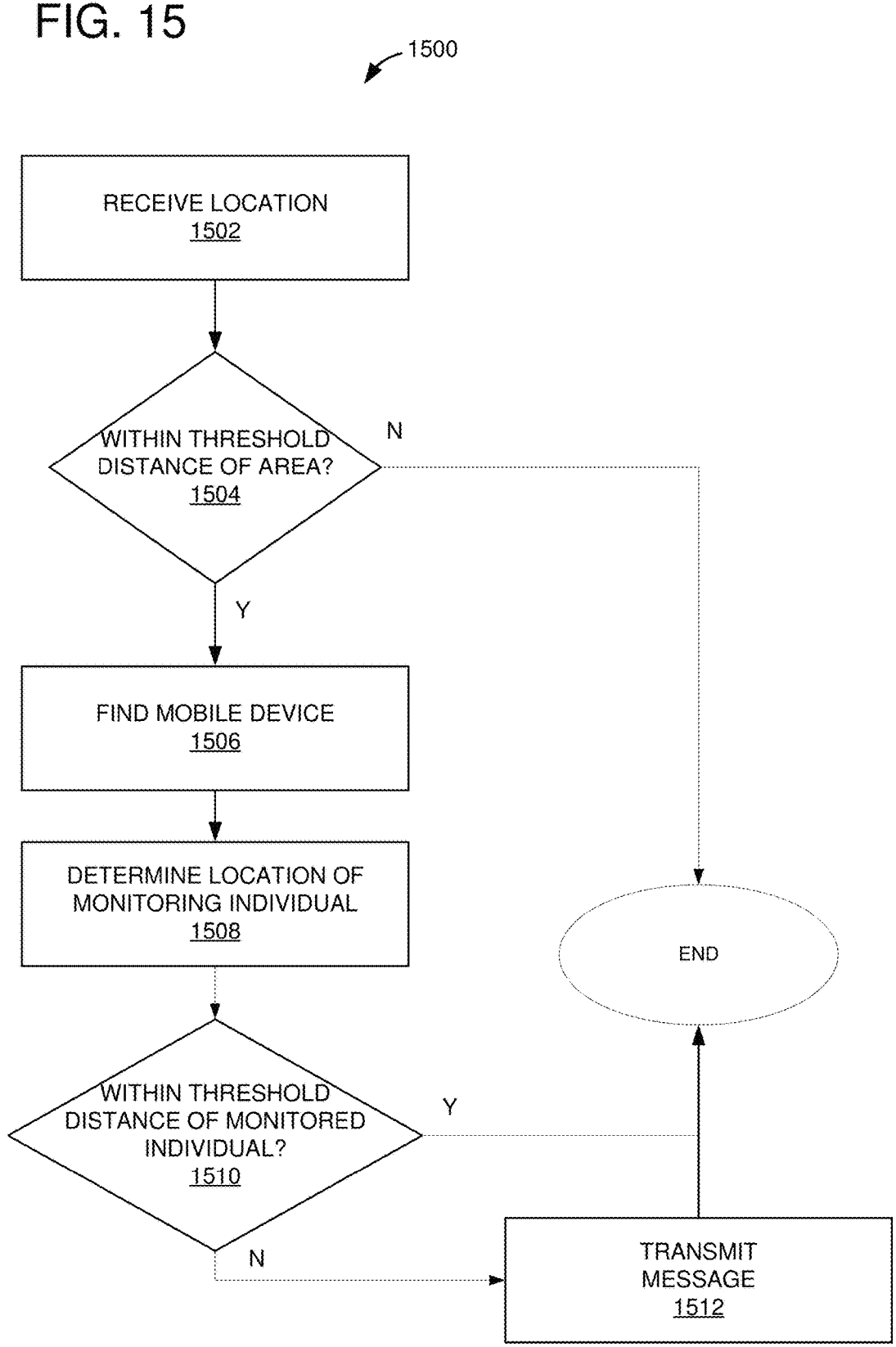
FIG. 15 is a flowchart depicting a third example method according to disclosed technologies.

FIG. 15 is a flowchart 1500 depicting an example method for determining if a monitored individual is in close proximity to a designated area but not in close proximity to a monitoring individual. The example of FIG. 15 begins at process block 1502 when the communication interface 602 of the data hosting system 113 receives a location of a monitored individual. At process block 1504, the proximity tool 614 determines if the location of the monitored individual is within a threshold distance of a designated area. If the proximity tool determines that the monitored individual is not within a threshold distance of a designated area, the example of FIG. 15 ends. If the proximity tool determines that the monitored individual is within a threshold distance of a designated area, then the association tool determines a mobile device that is associated with the monitored individual at process block 1506.

After determining the mobile device associated with the monitored individual, in process block 1508 the data hosting system 113 determines the location of the mobile device (e.g., by querying the database 114 and looking up the most recently stored location of the mobile device). The proximity tool 614 then determines whether the mobile device is within a threshold distance from the monitored individual. If the proximity tool determines that the mobile device is not within a threshold distance of the monitored individual, the communication interface sends a message to the mobile device. If the proximity tool determines that the mobile device is within a threshold distance of the monitored individual, the example of FIG. 16 ends.

Figure 16:
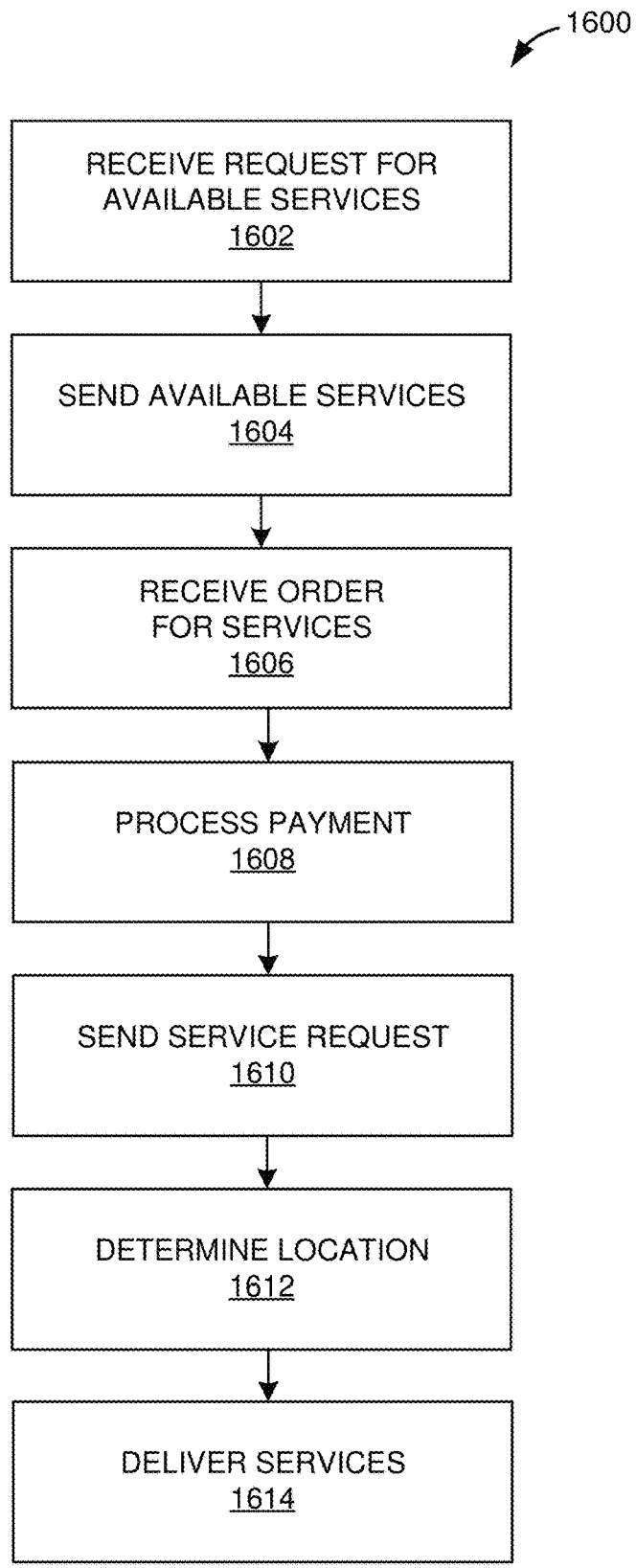
FIG. 16 is a flowchart depicting a fourth example method according to disclosed technologies.

FIG. 16 is a flowchart 1600 depicting an example method for an individual to order goods or services using the location system 100. The example of FIG. 16 begins at process block 1602 when the communication interface 602 receives a request from mobile device 105 for available services. After receiving this request, the communication interface 602 sends a list of available services sent to the mobile device at process block 1604. The communication interface 602 then receives an order from mobile device 105 for specific services at process block 1606. The location system application then processes payment for the ordered services at process block 1608.

The communication interface 602 then sends the service request to an appropriate staff member to prepare the ordered services at process block 1610. The location determination tool 604 then determines the location of the mobile device 105 that order was received from at process block 1612. When the ordered services are ready, they are delivered to the determined location at process block 1614. The example of FIG. 16 then ends.

Figure 17:
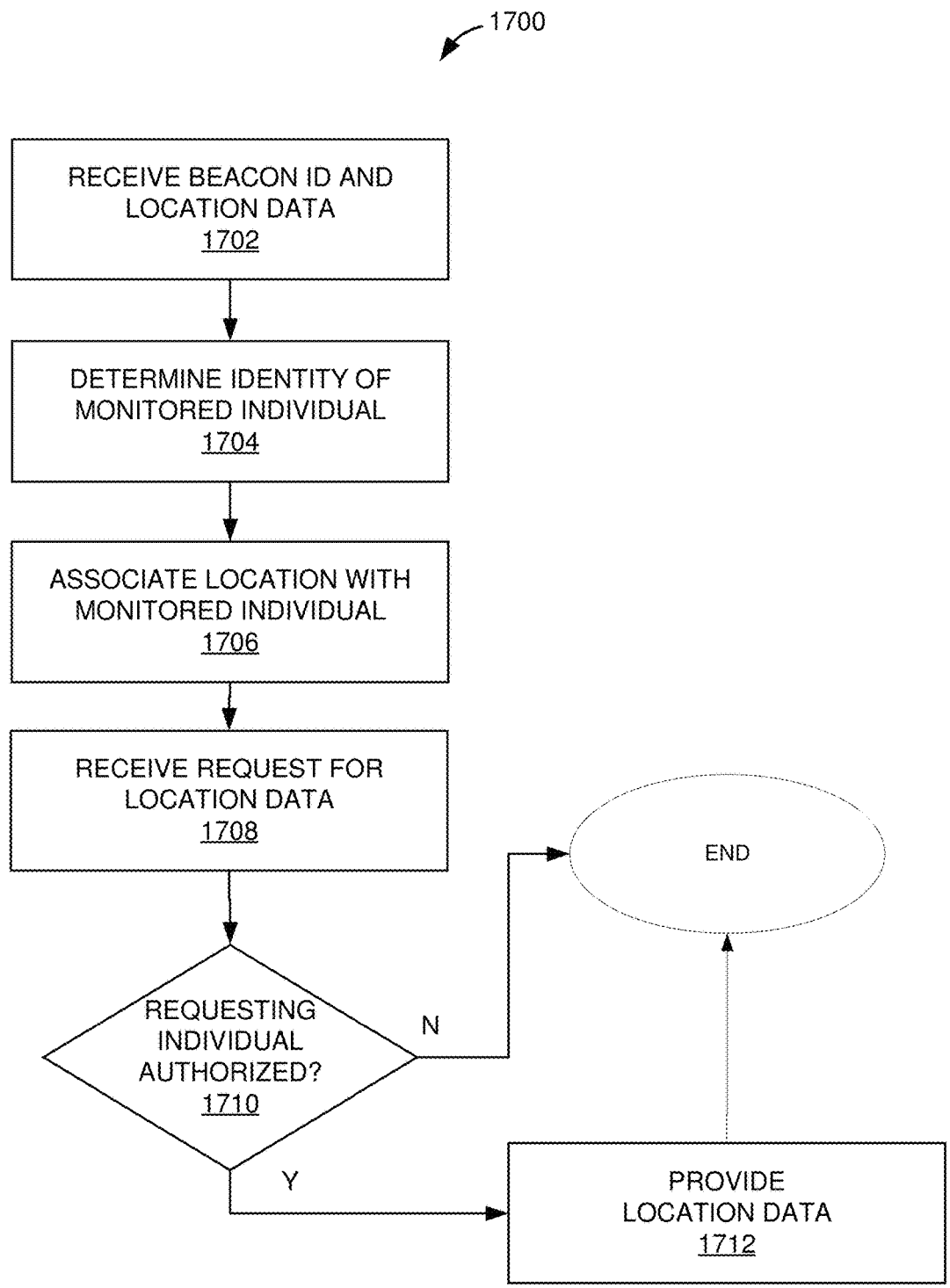
FIG. 17 is a flowchart depicting a fifth example method according to disclosed technologies.

FIG. 17 is a flowchart 1700 depicting an example method for tracking the location of a monitored individual according to the disclosed technologies. The example of FIG. 17 begins at process block 1702 when the data hosting system 113 receives a beacon identifier and the location of a beacon associated with the beacon identifier from the individual location monitoring system 104. At process block 1704, the association tool 608 of the system 113 determines the identity of a monitored individual that is associated with the beacon identifier. At process block 1706, the association tool 608 associates the location of the beacon with the identity of the monitored individual. At process block 1708, the communication interface 602 receives a request for the location of the monitored individual from a device associated with a requesting individual. The request may include authentication credentials. At process block 1710, the authentication tool 606 determines whether the requesting individual is authorized to access data about the monitored individual based at least in part on the authentication credentials in the request. If the authentication tool determines that the requesting individual is authorized to access location data about the monitored individual, the communication interface 602 provides (e.g., by transmitting) the location and identity of the monitored individual to the device associated with the monitoring individual. If the authentication tool determines that the requesting individual is not authorized to access location data about the monitored individual, the example of FIG. 17 ends. In this manner, the identity of the monitored individual is stored on the data hosting system and is inaccessible to the owner/operator of the individual location monitoring system.

Figure 18:
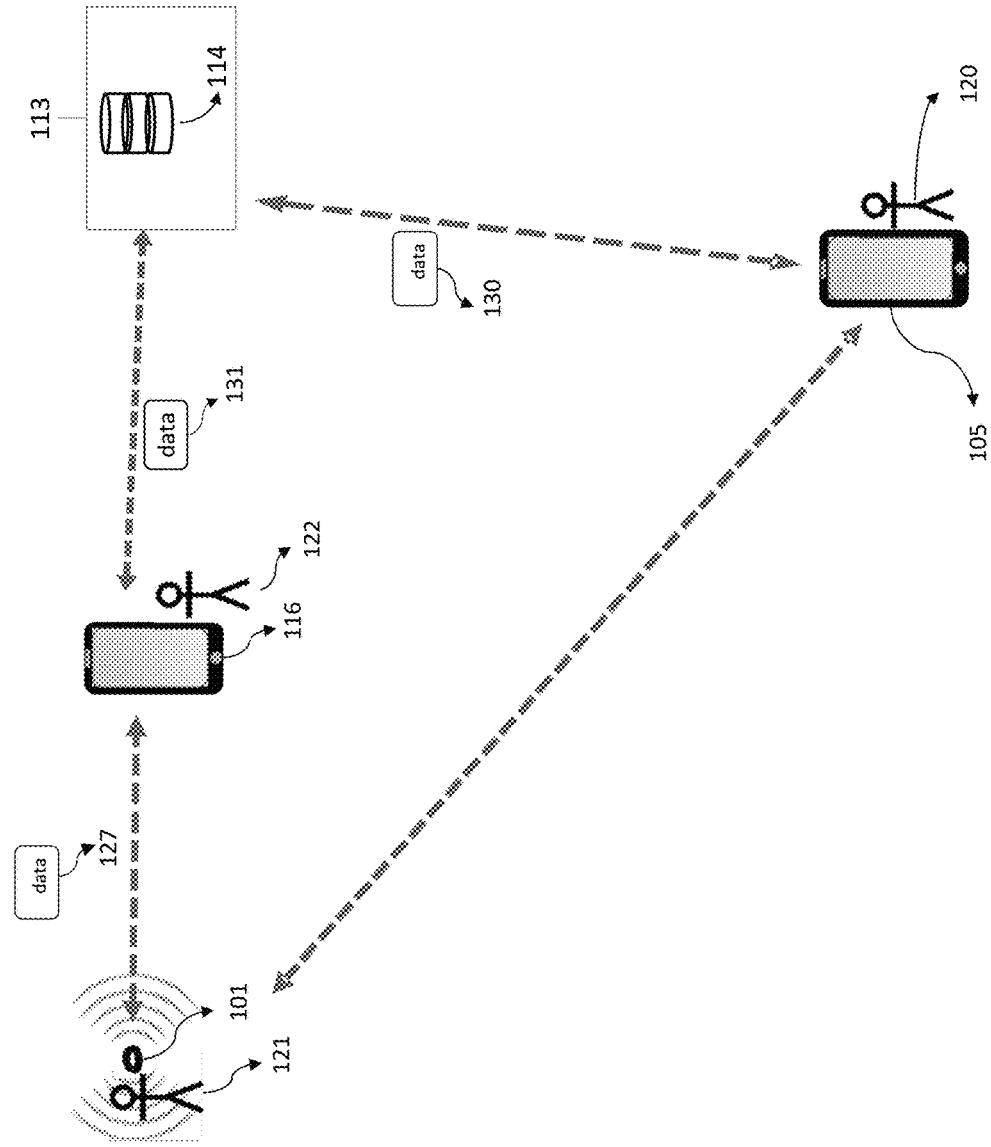
FIG. 18 is a schematic illustration of a real time location system including check-in and check-out functionality, according to another embodiment of the disclosed technologies.

FIG. 18 shows a block diagram of a representative embodiment of a real time location system 1800 including check-in and/or check-out functionality, according to another embodiment. The check-in and check-out functionality can be related to, for example, dropping a child off at a venue or attraction, and picking the child up from the venue or attraction. The location system 1800 has similar elements to the elements of location system 100 of FIG. 1. In the example of FIG. 18, the beacon 101 being worn, held, or carried by the child 121 periodically sends out data packet 121 (e.g., via Bluetooth®) containing a beacon identifier. Individual 122 can be a counselor, staff member, or other individual acting as a temporary guardian or instructor of child 121 at a site (e.g., a summer camp, sports camp, day care, etc.) operating an individual location monitoring system, such as the system 104 of FIG. 1. The individual 122 can be running a check-in application on the mobile device 116 (e.g., a smartphone). The mobile device 116 can receive data packet 127 when the beacon 101 and the mobile device 116 are in close proximity. In the illustrated example, when the mobile device 116 receives data packet 127, a check-in process is triggered, as described in further detail below. In some examples, the check-in process is triggered when the device 116 receives data packet 127 at power level that is above a certain threshold (e.g., above a threshold indicating a distance between the device 116 and the beacon 101 of, for example, 12 inches or less). In other examples, the check-in application on the mobile device can display a list of children, and individual 122 can manually select one or more children to trigger the check-in process for the selected children.

When the check-in process is triggered for child 121, the individual 122 can use the check-in application to send a check-in request for the child 121, which can cause the device 116 to transmit data packet 131 to the data hosting system 113 with a request to record that the child is present at the site of the system 104 (e.g., that the child is "checked in"). The data packet 131 can include the beacon identifier associated with beacon 101. Communication interface 602 can receive data packet 131 and the association tool 608 can determine a monitoring individual that is authorized to check-in the child 121, such as parent 120. This data about individuals that are authorized to check-in a child can be stored in database 114 in a data table similar to the authentication credentials data table 800 of FIG. 8. After the association tool 608 determines a monitoring individual that is authorized to check-in child 121, the communication interface 602 can transmit a request to a mobile device associated with the authorized monitoring individual. The monitoring individual can then use their mobile device to approve the check-in request and their mobile device can send a signal to the data hosting system 113 approving the check-in request.

The communication interface 602 can receive the check-in approval and the data hosting system 113 can update database 114 to indicate that child 121 is checked-in with individual 122. The communication interface 602 can then send a signal indicating that the check-in was approved to mobile device 116. In some examples, the mobile device 116 may have a list of guardians associated with child 121 and individual 122 can manually select a guardian to approve the check-in.

A check-out process can be performed similarly. To initiate a check-out process, the mobile device 116 can receive a data packet 127 from beacon 101 and the individual 122 can use the check-in application on mobile device 116 to request a check-out. This causes mobile device 116 to send data packet 131 to the data hosting system 113 with the beacon identifier of the beacon 101 and a request for a check-out. The communication interface 602 can receive data packet 131 and the association tool 608 can determine a monitoring individual that is authorized to check-out child 121. The communication interface 602 can then send data packet 130 to a mobile device associated with the authorized monitoring individual requesting a check-out authorization. The monitoring individual can use their mobile device to authorize the check-out, which can cause their mobile device to send an authorization signal back to the data hosting system 113. The communication interface 602 can receive this signal and update database 114 to indicate that child 121 is no longer check-in with individual 122. The communication interface can then send a signal to mobile device 116 authorizing the check-out.

In certain embodiments, after child 121 is checked-in with a particular individual 122, the individual 122 may monitor the performance of the child in some particular task, such as their ability to make free throws at a basketball camp. In these embodiments, individual 122 (e.g., an instructor) can monitor a child's performance in some activity and enter their performance onto their mobile device (e.g., the number of free throws made by the child). This information can then be transmitted to the data hosting system 113, which can then forward the information to a monitoring individual associated with the child (e.g., a parent). This can allow a parent to monitor their child's activities while the child is away at camp or another venue where their performance on some task can be monitored. In some embodiments, statistics about a child's activities or performance (e.g., during a sport) can be aggregated and transmitted to the parent's device (e.g., upon request) in the form of a card or tile that can be displayed on the parent's device, and/or posted to a social media platform. In some embodiments, the card or tile may include a photo of the child in addition to the performance statistics. In another example, the individual 122 can be a doctor or nurse and the individual 121 can be a patient. In these examples, the information entered into mobile device 116 and forwarded to a monitored individual can be medical information about the patient.

Representative Computing Environment

Figure 19:
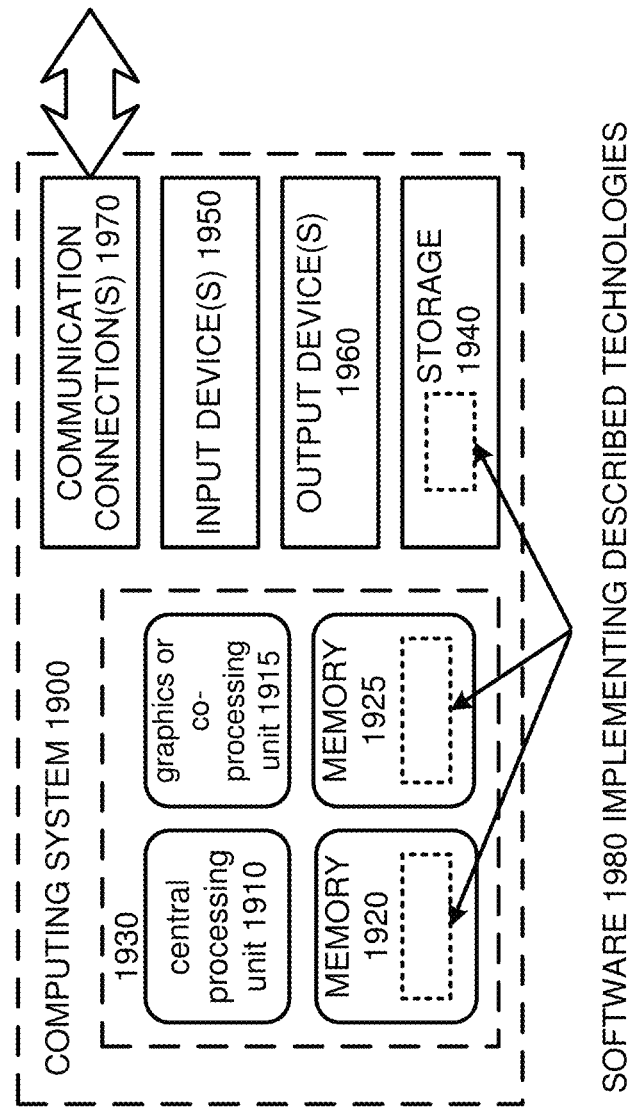
FIG. 19 is a diagram schematically depicting a computing environment suitable for implementation of disclosed technologies.

FIG. 19 depicts a generalized example of a suitable computing environment 1800 in which software and control algorithms for the described technology may be implemented. The computing environment 1900 is not intended to suggest any limitation as to scope of use or functionality, as the innovations may be implemented in diverse general-purpose or special-purpose computing systems. For example, the computing environment 1900 can be any of a variety of computing devices (e.g., desktop computer, laptop computer, server computer, tablet computer, gaming system, mobile device, programmable automation controller, etc.).

With reference to FIG. 19, the computing environment 1900 includes one or more processing units 1910, 1915 and memory 1920, 1925 (e.g., for storing data indicative of stage vibration). In FIG. 19, this basic configuration 1930 is included within a dashed line. The processing units 1910, 1915 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 may be volatile memory (e.g., registers, cache, RAM), non-volatile memory (e.g., ROM, EEPROM, flash memory, etc.), or some combination of the two, accessible by the processing unit(s). The memory 1920, 1925 stores software 1980 implementing one or more innovations described herein, in the form of computer-executable instructions suitable for execution by the processing unit(s).

A computing system may have additional features. For example, in some embodiments, the computing environment 1900 includes storage 1940, one or more input devices 1950, one or more output devices 1960, and one or more communication connections 1970. An interconnection mechanism (not shown) such as a bus, controller, or network, interconnects the components of the computing environment 1900. Typically, operating system software (not shown) provides an operating environment for other software executing in the computing environment 1900, and coordinates activities of the components of the computing environment 1900.

The tangible storage 1940 may be removable or non-removable, and includes magnetic disks, magnetic tapes or cassettes, CD-ROMs, DVDs, or any other medium that can be used to store information in a non-transitory way and can be accessed within the computing environment 1900. The storage 1940 stores instructions for the software 1980 implementing one or more innovations described herein (e.g., for transmitting data of a monitored individual in response to a request).

The input device(s) 1950 may be, for example: a touch input device, such as a keyboard, mouse, pen, or trackball; a voice input device; a scanning device; any of various sensors; another device that provides input to the computing environment 1900; or combinations thereof. For video encoding, the input device(s) 1950 may be a camera, video card, TV tuner card, or similar device that accepts video input in analog or digital form, or a CD-ROM or CD-RW that reads video samples into the computing environment 1900. The output device(s) 1960 may be a display, printer, speaker, CD-writer, or another device that provides output from the computing environment 1900.

The communication connection(s) 1970 enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

The invention claimed is:

1. A method comprising:
with a data hosting system, receiving a beacon identifier and a location of a beacon associated with the beacon identifier from an individual location monitoring system, the individual location monitoring system comprising a first computer system operated by a first entity, wherein the location of the beacon is determined by the first computer system, and the data hosting system comprises a second computer system and is operated by a second entity;
with the data hosting system, determining an identity of a monitored individual associated with the beacon identifier based at least in part on the beacon identifier;
with the data hosting system, associating the location of the beacon with the identity of the monitored individual;
with the data hosting system, receiving a request from a device associated with a requesting individual for the location of the monitored individual, the request including authentication credentials associated with the monitored individual;
with the data hosting system, verifying that the requesting individual is authorized to access data about the monitored individual based at least in part on the authentication credentials in the request; and
providing the location of the monitored individual to the device associated with the requesting individual;
wherein the identity of the monitored individual is stored on the data hosting system and is inaccessible to the individual location monitoring system operated by the first entity.

2. The method of claim 1, wherein the device associated with the requesting individual is a mobile device, and the method further comprises:
with the data hosting system:
determining a location of the mobile device;
determining a first distance between the mobile device and the monitored individual; and
sending a message to the mobile device if the first distance is greater than a predetermined threshold.

3. The method of claim 1, further comprising:
with the data hosting system, determining a first distance between the monitored individual and a predetermined geographic area; and
sending a signal to the device if the first distance is less than a predetermined threshold.

4. The method of claim 1, wherein the device associated with the requesting individual is a mobile device, and the method further comprises:
with the data hosting system:
determining a location of the mobile device;
determining a first distance between the monitored individual and a predetermined geographic area;

determining a second distance between the mobile device and the monitored individual; and sending a message to the mobile device if the first distance is less than a first threshold and the second distance is greater than a second threshold.

5. The method of claim 1, further comprising:

with the data hosting system, receiving a request from the device associated with the requesting individual to view video of the monitored individual, the request including the authentication credentials associated with the device;

with the data hosting system, verifying that the individual associated with the authentication credentials is authorized to access data about the monitored individual;

with the data hosting system, determining which of one or more video cameras operated by the individual location monitoring system is closest to the monitored individual; and with the data hosting system, sending a signal to the device to allow the device to view video from the determined video camera.

6. The method of claim 1, further comprising:

prior to receiving the beacon identifier and the location of the beacon associated with the beacon identifier, with the data hosting system, receiving a request from the device associated with the requesting individual for authentication credentials; and with the data hosting system, assigning the authentication credentials to the device.

7. The method of claim 1, further comprising:

prior to receiving the beacon identifier and the location of the beacon associated with the beacon identifier, with the data hosting system, receiving the identity of the monitored individual to be associated with the requesting individual and with the authentication credentials; and associating the authentication credentials with the requesting individual and with the identity of the monitored individual.

8. The method of claim 1, further comprising:

prior to receiving the beacon identifier and the location of the beacon associated with the beacon identifier, with the data hosing system, receiving the beacon identifier to be associated with the monitored individual, the beacon identifier being associated with the beacon to be worn by the monitored individual and configured to communicate with the individual location monitoring system; and associating the beacon identifier with the monitored individual.

9. The method of claim 8, further comprising providing the beacon identifier associated with the monitored individual to the individual location monitoring system.

10. The method of claim 7, further comprising encrypting the data of the identity of the monitored individual.

11. The method of claim 1, further comprising:

with the data hosting system, receiving a request from the device associated with the requesting individual to authorize a second individual to access data about the monitored individual, the request including the authentication credentials;

verifying that the requesting individual is authorized to access data about the monitored individual based at least in part on the authentication credentials; and authorizing the second individual to access data about the monitored individual.

12. The method of claim 1, wherein the monitored individual is a child and the requesting individual is the child's parent.

13. A system, comprising:

one or more beacons located within a defined area, the one or more beacons being configured to transmit beacon data packets including a beacon identifier and data associated with a location of the beacon from which the beacon data packet is transmitted;

a plurality of transceiver nodes located within the defined area, the transceiver nodes being configured, upon receipt of a beacon data packet, to transmit a transceiver node data packet including a transceiver node identifier, the beacon identifier of the beacon from which the beacon data packet was received, and the data associated with the location of the beacon from which the beacon data packet was received;

a first computer system comprising one or more processors and memory coupled thereto, the first computer system implementing an individual location monitoring system comprising:

a location determination tool to determine the location of the beacon based at least in part on the data associated with the location of the beacon; and a first communication interface to transmit the determined location and the beacon identifier to a data hosting system; and a second computer system comprising one or more processors and memory coupled thereto, the second computer system implementing a data hosting system comprising:

a second communication interface to receive a request from a device associated with a requesting individual for the location of a monitored individual;

an association tool to determine the identity of the monitored individual associated with the beacon identifier of the beacon from which the beacon data packet was received, and associate the location of the beacon with the identity of the monitored individual; and an authentication tool to verify that a device associated with the requesting individual is authorized to receive the location of the beacon;

wherein the second communication interface is configured to transmit the location of the beacon to the device associated with the requesting individual.

14. The system of claim 13, wherein the transceiver nodes are configured to measure metadata associated with the reception of the beacon data packets, and wherein the transceiver node data packet includes the metadata.

15. The system of claim 14, wherein the metadata comprises a power level, angle, or time associated with the reception of the beacon data packets.

16. The system of claim 13, wherein the location determination tool is configured to determine a location of the device associated with the requesting individual;

wherein the data hosting system further comprises a proximity tool to determine a distance between the device associated with the requesting individual and the monitored individual; and wherein the second communication interface is further configured to send a message to the device associated with the requesting individual if the distance is greater than a predetermined threshold.

17. The system of claim 13, wherein the data hosting system further comprises a proximity tool to determine a distance between the monitored individual and a predetermined geographic area, wherein the second communication interface is further configured to send a message to the device associated with the requesting individual if the distance is less than a predetermined threshold.

18. The system of claim 13, wherein the location determination tool is configured to determine a location of the device associated with the requesting individual;
   wherein the data hosting system further comprises a proximity tool to determine a first distance between the monitored individual and a predetermined geographic area and to determine a second distance between the device and the monitored individual; and
   wherein the second communication interface is further configured to send a message to the device if the first distance is less than a first threshold and the second distance is greater than a second threshold.

19. The system of claim 13, wherein the data hosting system further comprises a camera finder to determine which of one or more video cameras is closest to the location of the monitored individual, wherein the second communication interface is configured to receive a request from the device to view video of the monitored individual; and
   wherein the second communication interface is configured to send a signal to the device to allow the device to view video from the determined video camera.

20. The method of claim 1, wherein:
   the monitored individual is a first monitored individual, and the method further comprises, with the data hosting system, receiving a plurality of beacon identifiers and a plurality of locations associated with a plurality of monitored individuals;
   the first monitored individual is associated with an account of the requesting individual; and
   the authentication credentials permit the requesting individual to receive the location of only the first monitored individual associated with the requesting individual's account.

* * * * *